United States Patent [19]
Longbottom et al.

[11] Patent Number: 5,564,503
[45] Date of Patent: Oct. 15, 1996

[54] METHODS AND SYSTEMS FOR SUBTERRANEAN MULTILATERAL WELL DRILLING AND COMPLETION

[75] Inventors: James R. Longbottom, Whitesboro; Don C. Cox, Roanoke; John C. Gano, Carrollton; William R. Welch, Carrollton; Pat M. White, Carrollton, all of Tex.

[73] Assignee: Halliburton Company, Dallas, Tex.

[21] Appl. No.: 296,941

[22] Filed: Aug. 26, 1994

[51] Int. Cl.⁶ .................................................. E21B 43/14
[52] U.S. Cl. ................................. 166/313; 166/117.6
[58] Field of Search ................................. 166/313, 384, 166/50, 117.5, 117.6

[56] References Cited

U.S. PATENT DOCUMENTS

| | | | |
|---|---|---|---|
| 1,900,164 | 3/1933 | Dana et al. | |
| 2,281,414 | 4/1942 | Clark | 255/1.6 |
| 2,362,529 | 11/1944 | Barrett et al. | 255/1.6 |
| 2,397,070 | 3/1946 | Zublin | 166/4 |
| 2,452,920 | 11/1948 | Gilbert | 255/1.6 |
| 2,509,144 | 5/1950 | Grable et al. | 255/1.6 |
| 2,699,920 | 1/1955 | Zublin | 255/1.6 |
| 2,797,893 | 7/1957 | McCune et al. | 255/1.6 |
| 2,858,107 | 10/1958 | Colmerauer | 255/1.6 |
| 3,002,454 | 10/1961 | Chesnut | 102/21 |
| 3,330,349 | 7/1967 | Owsley et al. | 166/21 |
| 4,396,075 | 8/1983 | Wood et al. | 175/79 |
| 4,397,360 | 8/1983 | Schmidt | 175/61 |
| 4,402,551 | 9/1983 | Wood et al. | 299/5 |
| 4,415,205 | 11/1983 | Rehm et al. | 299/5 |
| 4,420,049 | 12/1983 | Holbert | 175/45 |
| 4,573,541 | 3/1986 | Josse et al. | 175/78 |

(List continued on next page.)

FOREIGN PATENT DOCUMENTS 1645428  4/1991  U.S.S.R. .

OTHER PUBLICATIONS

Ackert, David, "Looking Sideways For Oil", *The Technical Review*, vol. 36, No. 1, pp. 22–31.
Power, Michael, "Completing Deep Horizontal Well", *Petroleum Engineer International*, Nov. 1990, pp. 37–41.
Brown, Ernie, "The Challenge of Completing and Stimulating Horizontal Wells", *Oilfield Review*, vol. 2, No. 3, pp. 52–63.
Holbert, D. R., "New Interest in Drainhole Drilling Revives Technology", *World Oil*, Mar. 1981, pp. 57–72.
Hardman, P., "Beckingham 36 Horizontal Well", *SPE Drilling Engineering*, Mar. 1989, pp. 17–23.
Webster, "Cementing of Horizontal Wells", *Horizontal Well Completions*, pp. 9–14.

*Primary Examiner*—William P. Neuder
*Attorney, Agent, or Firm*—William M. Imwalle; Paul I. Herman; Charles W. Gaines

[57] ABSTRACT

Improved methods and systems for creating a multilateral well and improved multilateral well structures. In one aspect of the present invention, the method comprises the steps of: (1) setting a diverter at a prescribed position and a prescribed orientation in a main well flow conductor located within a main wellbore, (2) boring through a sidewall of the main well flow conductor and into a material surrounding the main well flow conductor, the boring creating a window having a particular shape in the sidewall, the orientation of the diverter determining a lateral position of the window in the main well flow conductor, a lateral wellbore thereby being formed in the material and extending from the main wellbore, (3) lining the lateral wellbore with a liner, the liner having an interface end, the interface end adapted to contact a periphery of the window in the sidewall and (4) cementing the liner in place within the lateral wellbore, the step of cementing creating a pressure-bearing seal between the periphery of the window and the interface end of the liner. The method allows multiple lateral wellbores to be joined to the main wellbore and provides for connectivity among main and lateral wellbores, pressure-bearing sealing of joints to allow selective isolation of one or more wellbores or portions thereof and subsequent wellbore access for rework or other purposes.

83 Claims, 7 Drawing Sheets

U.S. PATENT DOCUMENTS

| | | | |
|---|---|---|---|
| 4,807,704 | 2/1989 | Hsu et al. | 166/313 |
| 4,880,067 | 11/1989 | Jelsma | 175/107 |
| 5,012,877 | 5/1991 | Winters et al. | 175/80 |
| 5,113,938 | 5/1992 | Clayton | 166/117.6 |
| 5,115,872 | 5/1992 | Brunet et al. | 175/61 |
| 5,131,467 | 7/1992 | Osborne et al. | 166/117.6 |
| 5,188,190 | 2/1993 | Skaalure | 175/88 |
| 5,289,876 | 3/1994 | Graham | 166/276 |
| 5,301,760 | 4/1994 | Graham | 175/61 |
| 5,311,936 | 5/1994 | McNair et al. | 166/50 |
| 5,318,121 | 6/1994 | Brockman et al. | 166/50 X |
| 5,318,122 | 6/1994 | Murray et al. | 166/313 |
| 5,322,127 | 6/1994 | McNair et al. | 166/313 |
| 5,325,924 | 7/1994 | Bangert et al. | 166/313 |
| 5,337,808 | 8/1994 | Graham | 166/191 |
| 5,353,876 | 10/1994 | Curington et al. | 166/313 |

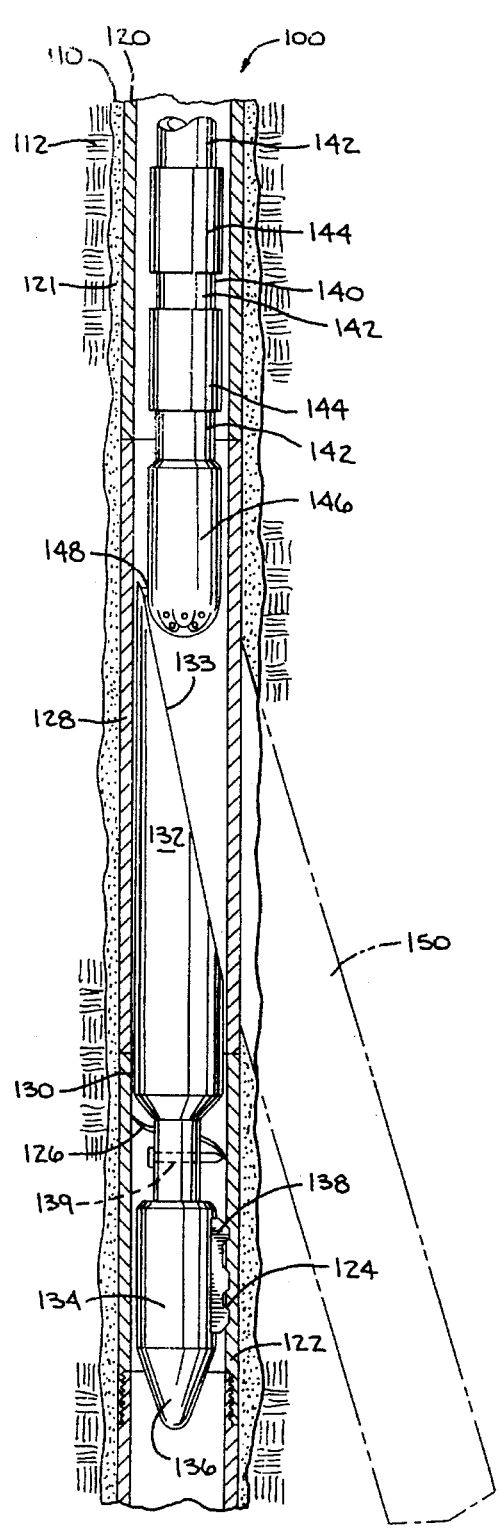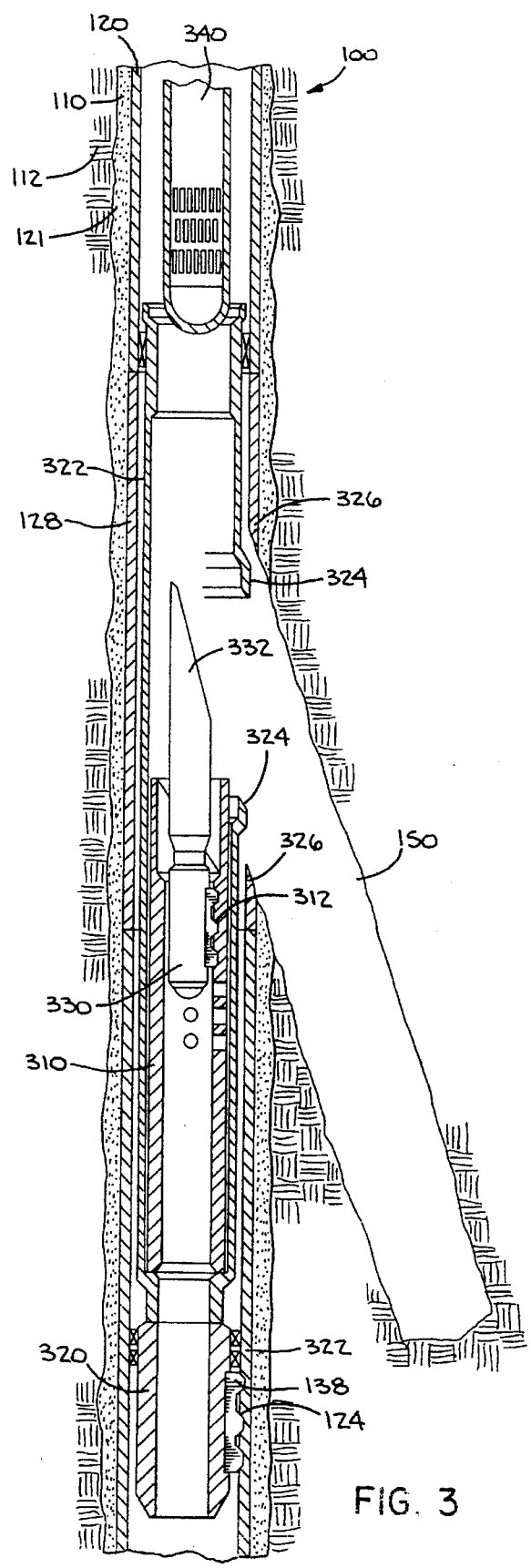
FIG. 1
FIG. 3

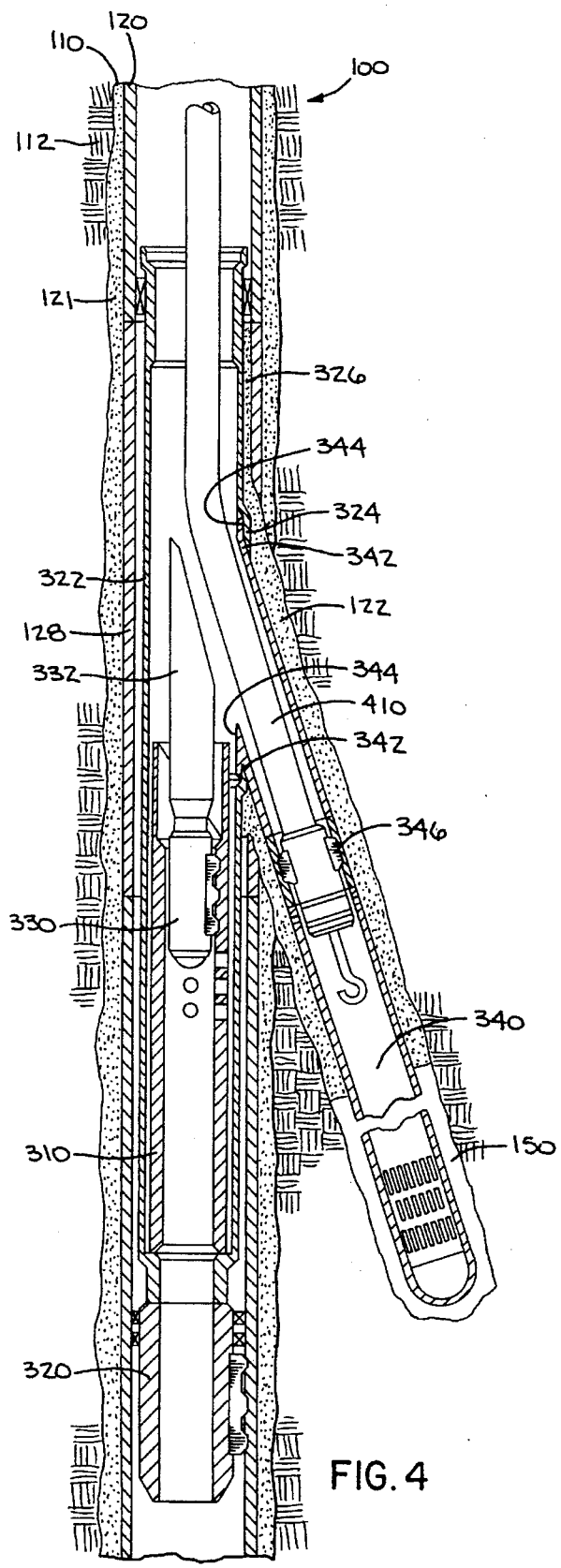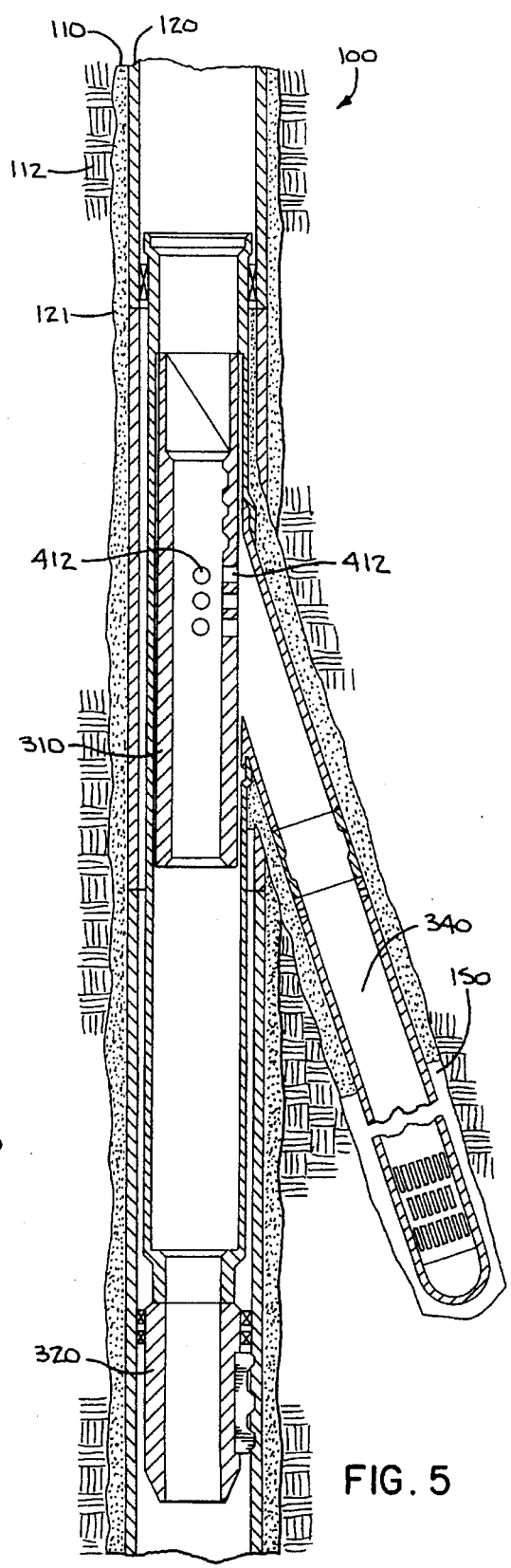

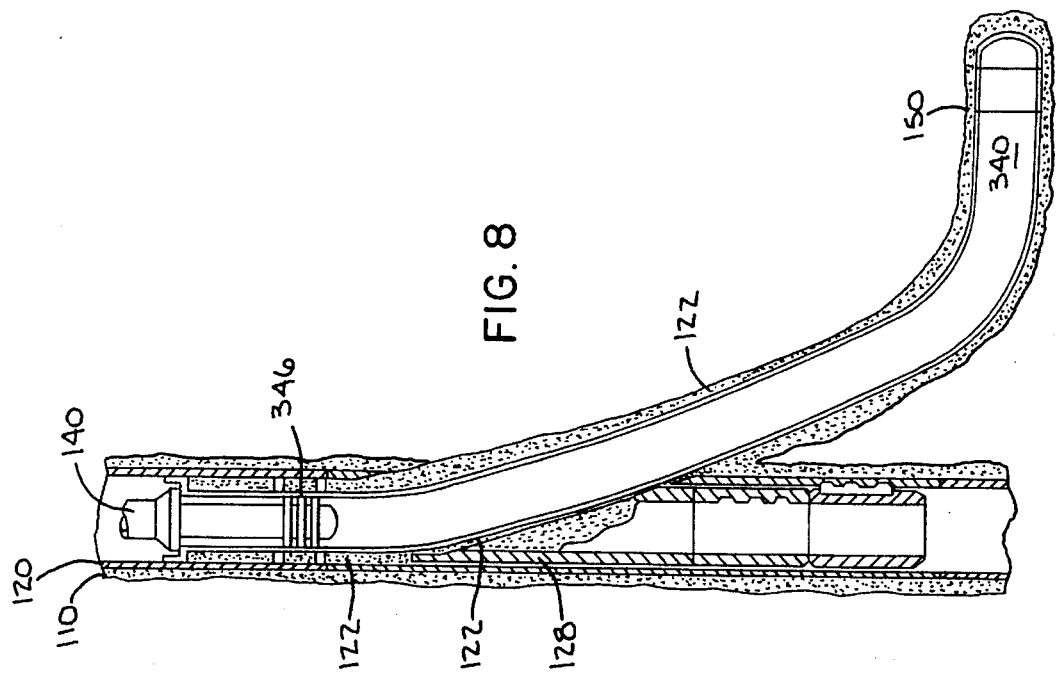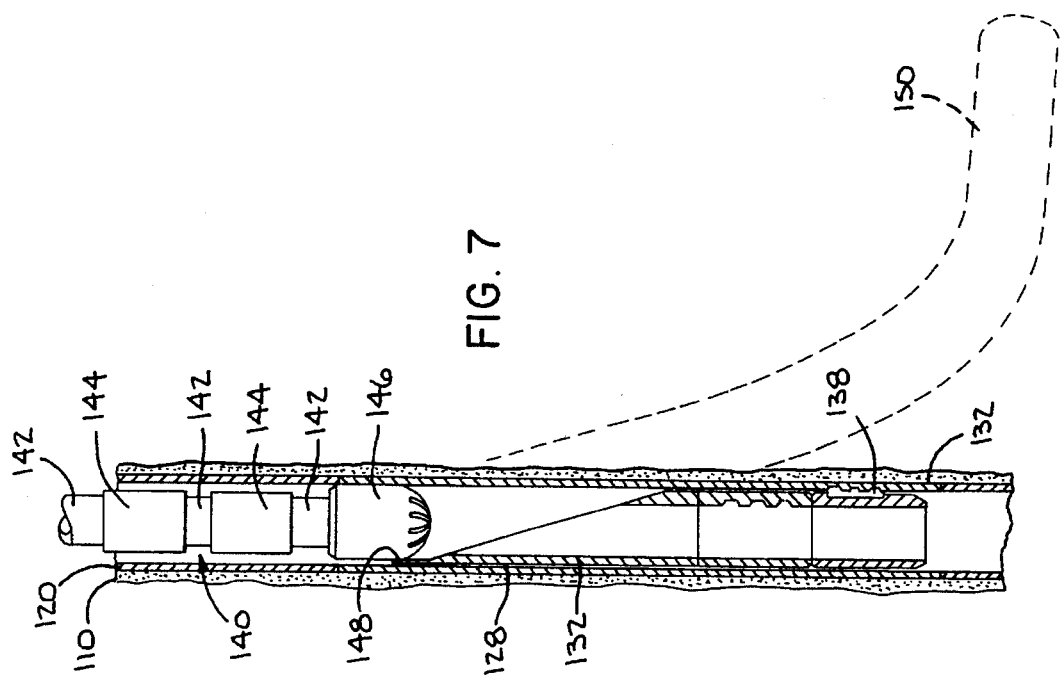

5,564,503

METHODS AND SYSTEMS FOR SUBTERRANEAN MULTILATERAL WELL DRILLING AND COMPLETION

TECHNICAL FIELD OF THE INVENTION

The present invention is directed, in general, to well drilling and completion and more specifically to methods and systems for drilling and completing subterranean multilateral wells that provide for connectivity among main and lateral wellbores, pressure-bearing sealing of joints for selective isolation of wellbores or portions thereof and subsequent wellbore access for rework or other purposes.

BACKGROUND OF THE INVENTION

Horizontal well drilling and production have become increasingly important to the oil industry in recent years. While horizontal wells have been known for many years, only relatively recently have such wells been determined to be a cost-effective alternative to conventional vertical well drilling. Although drilling a horizontal well costs substantially more than its vertical counterpart, a horizontal well frequently improves production by a factor of five, ten or even twenty in naturally-fractured reservoirs. Generally, projected productivity from a horizontal wellbore must triple that of a vertical wellbore for horizontal drilling to be economical. This increased production minimizes the number of platforms, cutting investment and operational costs. Horizontal drilling makes reservoirs in urban areas, permafrost zones and deep offshore waters more accessible. Other applications for horizontal wellbores include periphery wells, thin reservoirs that would require too many vertical wellbores, and reservoirs with coning problems in which a horizontal wellbore could be optimally distanced from the fluid contact.

Also, some horizontal wellbores contain additional wellbores extending laterally from the primary vertical wellbores. These additional lateral wellbores are sometimes referred to as drainholes and vertical wellbores containing more than one lateral wellbore are referred to as multilateral wells. Multilateral wells are becoming increasingly important, both from the standpoint of new drilling operations and from the increasingly important standpoint of reworking existing wellbores, including remedial and stimulation work.

As a result of the foregoing increased dependence on and importance of horizontal wells, horizontal well completion, and particularly multilateral well completion, have been important concerns and continue to provide a host of difficult problems to overcome. Lateral completion, particularly at the juncture between the main and lateral wellbores, is extremely important to avoid collapse of the wellbore in unconsolidated or weakly consolidated formations. Thus, open hole completions are limited to competent rock formations; and, even then, open hole completions are inadequate since there is no control or ability to access (or reenter the lateral) or to isolate production zones within the wellbore. Coupled with this need to complete lateral wellbores is the growing desire to maintain the lateral wellbore size as close as possible to the size of the primary vertical wellbore for ease of drilling and completion.

The above concerns can be summarized in three main objectives: connectivity, isolation and access. Connectivity refers to the mechanical coupling of casings in the main and lateral wellbores such that there are no open holes between casings. This ensures that the multilateral completion is not subject to collapse of a section of open hole and that open hole tools are not required to access portions of the completion.

Isolation refers to the ability to seal off one or more wellbores, or any selectable portion thereof, without impeding production from remaining wellbores or portions. To isolate one wellbore from another effectively, the casings in the wellbores must be hydraulically sealed to one another to allow the multilateral completion as a whole to withstand hydraulic pressure. Hydraulic sealing is particularly important at the juncture between main and lateral wellbores. Without hydraulic sealing, either pressure is lost into the void that surrounds the casing or fluid or particulate contaminates are allowed to enter the casing from the surrounding void. While connectivity, isolation and access are important in both horizontal and vertical wells, they are particularly important and pose particularly difficult problems in multilateral well completions. As mentioned above, isolating one lateral wellbore from other lateral wellbores is necessary to prevent migration of fluids and to comply with completion practices and regulations regarding the separate production of different production zones. Zonal (or partial wellbore) isolation may also be needed if the wellbore drifts in and out of the target reservoir because of insufficient geological knowledge or poor directional control. When horizontal wellbores are drilled in naturally-fractured reservoirs, zonal isolation is seen as desirable. Initial pressure in naturally-fractured formations may vary from one fracture to the next, as may the hydrocarbon gravity and likelihood of coning. Allowing the formations to produce together permits crossflow between fractures. A single fracture with early water breakthrough may jeopardize the entire well's production.

Access refers to the ability to reenter a selected one of the wellbores to perform completion work, additional drilling or remedial and stimulation work, preferably without requiring a full drilling rig. In the most preferable situation, any one of the lateral wellbores can be entered using coiled tubing, thereby saving money.

There have been several prior art techniques of completing multilateral wells using open-hole completion techniques. One involves the drilling of a single main wellbore and one or more lateral wellbores emanating from a base portion thereof. The main wellbore is cased except for the base portion. The base portion and the one or more lateral wellbores are left open-hole. Although this completion technique is relatively inexpensive, not one of the above three main objectives (connectivity, isolation and access) is satisfied, as there are portions of the wellbores left open-hole, the open-hole wellbores cannot be selectively sealed off, except to a limited degree with open-hole isolation tools and access to the lateral wellbores can only be by way of bent subs or orientation devices. Apart from the three main objectives, if one of the lateral wellbores collapses or becomes clogged, the entire well is threatened.

Another prior art completion technique calls for the drilling of one or more open hole lateral wellbores from a main wellbore. A special casing having a number of inflatable open-hole packers and perforations between the inflatable packers is placed in the main wellbore. The inflatable packers serve to separate the lateral wellbores hydraulically from one another. This technique therefore offers a degree of isolation, in that an entire lateral can be sealed off from the rest. However, portions of a lateral cannot be sealed off. Further, there is neither connectivity nor access. Finally, the lateral wellbores are left open-hole. Therefore, if a lateral wellbore collapses or becomes clogged, production from that wellbore is compromised.

Conventionally, some multilateral completion techniques have employed slotted liner completion. The primary purpose of inserting a slotted liner in a lateral wellbores is to guard against hole collapse. Additionally, a liner provides a convenient path to insert various tools such as coiled tubing in the wellbore. Three types of liners have been used, namely: (1) perforated liners, where holes are drilled in the liner, (2) slotted liners, where slots of various width and length are milled along the line length, and (3) prepacked screens.

One prior art completion technique employing liners is similar to the first-described open-hole completion technique, but requires the lateral wellbores to be fitted with liners. However, the liners terminate within the lateral wellbores, resulting in short lateral wellbore sections proximate the main wellbore that are left open-hole. Similarly, the base portion of the main wellbore is left open-hole. Although not as inexpensive as the first-described open-hole technique, this completion technique is still relatively inexpensive. However, none of the above three main objectives is fully satisfied, as portions of each lateral wellbore and the base portion of the main wellbore are left open-hole. The open-hole wellbores cannot be selectively sealed off, except to a limited degree with open-hole isolation tools. Finally, access to the lateral wellbores can only be by way of bent subs or orientation devices. The sole advantage of this completion technique is that liners provide support as against erosion or collapse in most of the lateral wellbores length.

A second completion technique employing lined laterals involves two lateral wellbores extending from a main wellbore, one over the other, each having a liner and each liner extending back to a casing in the main wellbore. Thus, connectivity is achieved, as the liners are hydraulically sealed to the main wellbore casing. Unfortunately, the lower of the two lateral wellbores cannot be sealed off (isolated). Further, the lower of the two lateral wellbores cannot be accessed subsequently. Thus, only one of the three principal objectives is met.

A third completion technique employing lined laterals is reserved for new well completion and involves the drilling of multiple lateral wellbores from a main wellbore. A liner is inserted into the main wellbore. The liner is provided with windows therein corresponding to the position of the laterals. Thus, the main wellbore liner must be oriented when it is inserted. Next, liners are inserted into the lateral wellbores. The open ends of the lateral wellbore liners extend through the windows of the main wellbore liner. This technique is designed for new wells, because the location and orientation of the lateral wellbores must be prearranged. Applying the three main objectives, connectivity is present, but isolation is not since the lateral wellbore liners are not hydraulically sealed to the main wellbore liner. Access to the lateral wellbores for the purpose of reworking or isolating a lateral wellbore is also less than optimum since it must be made by way of bent subs or orientation devices.

One further prior art completion technique does not involve either open-hole or lined lateral wellbores. This technique requires the drilling of a relatively large main wellbore. Multiple lateral wellbores are drilled in parallel through the bottom of the main wellbore and spread in separate directions. The main and lateral wellbores are cased and sealed together. All three of the three main objectives are met, as isolation of and access to each lateral wellbore are provided. However, in most cases, only two or three lateral wellbores are allowed, as the cross-sectional areas of the lateral wellbores must fit within the cross-sectional area of the main wellbore. This severely limits the cost effectiveness of the well as a whole, as the main wellbore must be of exceptionally large diameter and thus relatively expensive to drill.

The problem of lateral wellbore (and particularly multilateral wellbore) completion has been recognized for many years as reflected in the patent literature, For example, U.S. Pat. No. 4,807,704 discloses a system for completing multiple lateral wellbores using a dual packer and a deflective guide member. U.S. Pat. No. 2,797,893 discloses a method for completing lateral wells using a flexible liner and deflecting tool. U.S. Pat. No. 2,397,070 similarly describes lateral wellbore completion using flexible casing together with a closure shield for closing off the lateral. In U.S. Pat. No. 2,858,107, a removable whipstock assembly provides a means for locating (e.g., accessing) a lateral subsequent to completion thereof. U.S. Pat. No. 3,330,349 discloses a mandrel for guiding and completing multiple horizontal wells. U.S. Pat. Nos. 4,396,075; 4,415,205; 4,444,276 and 4,573,541 all relate generally to methods and devices for multilateral completions using a template or tube guide head. Other patents of general interest in the field of horizontal well completion include U.S. Pat. Nos. 2,452,920 and 4,402,551.

Notwithstanding the above-described attempts at obtaining cost-effective and workable lateral well completion, there continues to be a need for new and improved methods and devices for providing such completions, particularly sealing between the juncture of vertical and lateral wells, the ability to access lateral wells (particularly in multilateral systems) and achieving zone isolation between respective lateral wells in a multilateral well system.

There is also a need for gaining economy in lateral well completions. Toward this end, it is highly advantageous to minimize the number of trips necessary to drill and complete a lateral wellbore.

Therefore, what is needed in the art are methods and systems for multi-lateral well drilling and completion that provide for connectivity among main and lateral wellbores, pressure-bearing sealing of joints to allow selective isolation of wellbores or portions thereof and subsequent wellbore access for rework or other purposes. The methods and systems should further allow for access without requiring rig intervention, minimize the number of trips necessary to complete the well, provide multiple lateral (3 or more) capability for each main wellbore and be useable in both new and existing wells. Finally, the methods and systems should allow for conventional cementing, lining and washdown operations and accommodate high build rates after exiting the main wellbore.

SUMMARY OF THE INVENTION

To address the above-discussed deficiencies of the prior art, it is a primary object of the present invention to provide methods and systems for accomplishing multilateral wellbore completion and an improved multilateral well structure that satisfy the three main objectives (connectivity, isolation and access) as set forth above.

In the attainment of the above primary object, one aspect of the present invention provides an improved method of creating a multilateral well comprising the steps of: (1) setting a diverter at a prescribed position and a prescribed orientation in a main well flow conductor located within a main wellbore, (2) boring through a sidewall of the main well flow conductor and into a material surrounding the main well flow conductor, the boring creating a window having a particular shape in the sidewall, the orientation of the diverter determining a lateral position of the window in the main well flow conductor, a lateral wellbore being thereby formed in the material and extending from the main wellbore, (3) lining the lateral wellbore with a liner, and (4) cementing the liner in place within the lateral wellbore, the step of cementing creating a pressure-bearing seal between the periphery of the window and the interface end of the liner.

The method allows multiple lateral wellbores to be joined to the main wellbore and provides for connectivity among main and lateral wellbores, pressure-bearing sealing of joints to allow selective isolation of wellbores or portions thereof and subsequent wellbore access for rework or other purposes. Thus, this aspect of the present invention allows multilateral wells to be created having pressure-sealed joints between the main wellbore and the various lateral wellbores extending from the main wellbore. In a manner to be shown in more detail, entire lateral wellbores or only selected portions thereof may be sealed off to prevent contamination of, or other harm to, the remainder of the well. Further, the present method allows for selective subsequent access of any one of the lateral wellbores for rework or any other purpose. Most often, access is by way of coiled tubing, dramatically decreasing the cost of maintaining or improving the well.

In a preferred embodiment of this aspect of the present invention, the method further comprises the step of setting the main well flow conductor in the main wellbore, the main well flow conductor including a nipple for locating the diverter at the prescribed position in the main well flow conductor. This embodiment is directed principally to use this aspect of the present invention in a new well environment, wherein nipples can be integrated into casing or production tubing as it is lowered into the main wellbore.

In this embodiment, the nipple preferably conforms to that disclosed in Ser. No. 08/186,346, filed on Jan. 25, 1994, entitled "Select-20™ Orienting, Retrievable Whipstock Anchor," commonly assigned with the present invention and incorporated herein by reference. As disclosed therein, the nipple has a profile on an inner surface thereof. The profile corresponds to only one of many possible spring-loaded keys that may be set into an assembly containing the diverter and sent longitudinally through the main well flow conductor. If the assembly is set with a key corresponding to the nipple's profile, the key engages with the profile, halting further movement of the diverter. If the key does not correspond, the assembly travels past the nipple without engaging therewith. Thus, nipples containing many unique profiles may be placed at selected locations along the length of the main well flow conductor, allowing diverters or any other objects to engage with only one of the selected locations as a function of the key chosen for the object. The present invention makes advantageous use of this locating system to create and subsequently access lateral wellbores in a reliable manner.

In a preferred embodiment of this aspect of the present invention, the method further comprises the step of setting the main well flow conductor in the main wellbore, the main well flow conductor including a helical guide therein for rotating the diverter into the prescribed orientation in the main well flow conductor. This embodiment is also directed primarily to a new well, in which the helical guide, that may be a recess or slot, is machined into an inner surface of the casing or is integral with the nipple.

In this embodiment, the above-disclosed nipple-profile and key system is also employed to advantage. As the diverter approaches a nipple, a spring-loaded orienting lug mounted on the diverter assembly engages with the helical guide, causing the diverter to rotate. If the key on the diverter assembly matches the nipple profile, the assembly engages the nipple and halts. The relative rotational relationship of the diverter and the assembly are preset such that, when the key engages and the assembly halts, the helical guide has caused the diverter to rotate into precisely the prescribed orientation within the main well flow conductor.

In a preferred embodiment of this aspect of the present invention, the method further comprises the step of setting the main well flow conductor in the main wellbore, the main well flow conductor including a joint composed of a composite material, the step of boring comprising the step of drilling through a sidewall of the joint and into the material surrounding the main well flow conductor with a single drilling tool. This embodiment, therefore, is also primarily directed at new wells, wherein a composite joint is inserted into the casing string as it is lowered into the main wellbore. The composite joint is preferably located before the nipple, such that the diverter is positioned with the composite joint when the keyed assembly engages the nipple. Common bit technology is employed to drill through the composite joint and into the surrounding earth, thereby eliminating the need for separate trips to (1) mill a window and (2) drill into earth.

In an alternative preferred embodiment of this aspect of the present invention, the method further comprises the step of setting a preformed window member having a preformed window of a prescribed shape formed therein into said main well flow conductor. Therefore, rather than relying on the drilling tool to form a window having the prescribed shape, a member having a preformed window is lowered into place and the interface end of the liner is cemented thereto. This is very important, as the sealing of the joint between the liner and the main well flow conductor may be ineffective if the window is not shaped as expected.

In a preferred embodiment of this aspect of the present invention, the method further comprises the step of setting a packing device within the main well flow conductor, the packing device including a nipple for locating the diverter at the prescribed position in the main well flow conductor and a helical guide therein for rotating the diverter into the prescribed orientation in the main well flow conductor. Therefore, the present invention can also advantageously operate in the environment of an existing well. This is a significant advantage that the present invention enjoys over the prior art, as the present invention, to be employed, does not require a particular well structure (wherein lateral wellbores bear a predetermined relationship to the main wellbore) or special preexisting devices in the main well flow conductor. Thus, lateral wellbores can be drilled, lined and hydraulically sealed to an existing cased main wellbore, dramatically enhancing production levels and the economic viability of existing wells.

In a preferred embodiment of this aspect of the present invention, the step of boring comprises the steps of milling the window into the sidewall of the main well flow conductor with a milling tool and drilling into the material surrounding the main well flow conductor with a drilling tool, the sidewall being composed of a metallic material. As with the previously described embodiment, this embodiment is directed principally to existing wells, wherein the main well flow conductor is composed of metal. Thus, a first trip with a metal milling bit is required to cut through the main well flow conductor. A second trip with a rock bit is required to drill the lateral wellbore. In some circumstances, intermediate trips may be necessary to deburr or otherwise finish the periphery of the window prior to lateral boring. However, once the window is formed, the method this aspect of the present invention does not materially deviate from that for a new well.

In a preferred embodiment of this aspect of the present invention, the step of setting the diverter comprises the step of setting a whipstock at the prescribed position and the prescribed orientation in the main well flow conductor, the whipstock having a slanted face thereon adapted to divert a boring tool. Thus, the diverter initially employed to divert the milling or drilling tool is a whipstock. The slanted face of a whipstock is conventionally hardened to deflect boring tools. After milling and/or drilling, an ordinary, non-hardened diverter may be used.

In a preferred embodiment of this aspect of the present invention, the steps of setting and boring are accomplished in a single trip, the diverter coupled to a boring tool for performing the step of boring via a severable link. This is a significant advantage this aspect of the present invention. The diverter and its associated assembly (perhaps including the locator key and orienting lug or, alternatively, including a notched profile on an upper surface of the associated assembly) are attached to the end of the drillstring (including the appropriate bit) with the severable link, such as a shear pin. The drillstring and the diverter assembly are lowered into the main well flow conductor as a single unit.

If a locator key and nipple are used to locate and orient the diverter (as in a new well), the key engages the appropriate nipple and the diverter assembly halts. In an existing well, pipe measuring techniques may be used to gauge depth and measurement-while-drilling ("MWD") technology may be employed to gauge orientation to set the packer hydraulically at the appropriate location and orientation.

Once the diverter has been set, weight is placed on the drillstring to shear the severable link; the bit drops, contacting the slanted face of the diverter and is diverted to initiate the lateral wellbore.

In a preferred embodiment of this aspect of the present invention, the step of lining comprises the step of washing down the liner until the liner reaches a final position within the lateral wellbore. An advantage this aspect of the present invention is that it is compatible with conventional washdown techniques, thereby ensuring that the liner is fully positioned within the lateral wellbore prior to cementing.

In a preferred embodiment of this aspect of the present invention, the method further comprises the step of injecting the cement into an annular space between the main well flow conductor and a wall of the main wellbore, the cement filling interstices between the periphery of the window and the interface end of the liner to create the pressure-bearing seal. After the lining is in place, the seal between the lining and the main well flow conductor must be perfected. Therefore, using conventional cementing techniques, a cementing tool is lowered into the main well flow conductor and to a location substantially in alignment with ports in either the main well flow conductor or the liner. A prescribed quantity of cement is injected through the ports into the annular space. The cement flows toward and into the interstices to effect the seal.

In one alternative embodiment of this aspect of the present invention, the method further comprises the step of injecting the cement into an annular space between the main well flow conductor and a wall of the main wellbore from ports located in the liner. This alternative offers the advantage of allowing the cement to flow upwards, discouraging voids from forming in the cement.

In another alternative embodiment of this aspect of the present invention, the method further comprises the step of injecting the cement into an annular space between the main well flow conductor and a wall of the main wellbore from ports located in the main well flow conductor. This alternative injects cement closer to the interstices than the first alternative, thereby offering the advantage of ensuring that the cement that perfects the seal is relatively free from debris that may be entrained were the cement forced to travel a greater distance in the wellbores.

In a preferred embodiment of this aspect of the present invention, the method further comprises the step of injecting an elastomeric cement into an annular space between the main well flow conductor and the main wellbore wall to thereby create a flexible seal between the main well flow conductor and the liner. In this embodiment, the elastomeric cement preferably conforms to that disclosed in U.S. Pat. No. 5,159,980 entitled "Well Completion and Remedial Methods Utilizing Rubber Latex Compositions," and U.S. patent application Ser. No. 08/041,083, filed on Apr. 01, 1993, entitled "Methods of Displacing Liquids Through Pipes", both of which are commonly assigned with the present invention and incorporated herein by reference. During the lifetime of the well, thermal, geologic and other stresses may shift the liner interface with respect to the periphery of the window. A cement having elastomeric properties can accommodate minor shifting, thereby maintaining the integrity of the seal. Those of skill in the art should understand, however, that ordinary drilling cement may be preferable to elastomeric cement, depending upon geological or cost considerations.

In a preferred embodiment of this aspect of the present invention, the method further comprises the step of removing the diverter from within the main well flow conductor to thereby allow access to a distal portion of the main well flow conductor. The present invention therefore allows full access to the remainder of the main well flow conductor and to lateral wellbores that extend therefrom.

In a preferred embodiment of this aspect of the present invention, the method further comprises the step of accessing a selected one of a distal portion of the main well flow conductor and the liner within the lateral wellbore with a coiled tube rig. This is a significant advantage of this aspect of the present invention. In a manner to be illustrated more completely, coiled tubing can be lowered into a completed well for rework or other purposes. The coiled tubing has one of a selectable number of conventional tools and a diverter assembly at an end thereof (if entry into a selected one of the lateral wellbores is desired). Again, the diverter assembly is keyed to engage with a nipple at a particular location within the main well flow conductor corresponding to the desired lateral wellbore. The tool contacts the slanted face of the diverter and enters the lateral wellbore.

In a preferred embodiment of this aspect of the present invention, the method further comprises the step of locating a slidable flow control device having ports therein proximate the window, the flow control device rotatable or longitudinally slidable (generically, "movable") within the well flow conductor to expose the window thereby allowing access to the liner by a tool. In this embodiment, the flow control device preferably conforms to that disclosed in U.S. Pat. No. 5,309,988, issued on May 10, 1994, entitled "Electromechanical Shifter Apparatus for Subsurface Well Flow Control," commonly assigned with the present invention and incorporated herein by reference.

In a preferred embodiment of this aspect of the present invention, the method further comprises the step of locating a slidable flow control device proximate the window, the flow control device substantially blocking a flow of fluid between the liner and the well flow conductor. Thus, the present invention may make use of a portless flow control device to block off an entirety of a selected lateral wellbore.

In a preferred embodiment of this aspect of the present invention, the method further comprises the step of repeating the setting, boring, lining and cementing steps at a second prescribed position and a second prescribed orientation in the main well flow conductor to yield a plurality of lined lateral wellbores formed in the material and extending from the main wellbore. Although the present invention applies to main wellbores having but a single lateral wellbore, this preferred embodiment yields a multilateral well having the advantages outlined previously.

Another aspect of the present invention provides a method of creating a multilateral well, comprising the steps of: (1) setting a diverter having a soft centered, cement or composite material drillable core at a prescribed position and a prescribed orientation in a main well flow conductor located within a main wellbore, the diverter severably coupled to an end of a drillstring, (2) boring through a sidewall of the main well flow conductor and into a material surrounding the main well flow conductor with a boring tool coupled to an end of the drillstring, the boring creating a window having a particular shape in the sidewall, the orientation of the diverter determining a lateral position of the window in the main well flow conductor, a lateral wellbore thereby being formed in the material and extending from the main wellbore, the steps of setting and boring performed in a single trip, (3) lining the lateral wellbore with a liner, and (4) cementing the liner in place within the lateral wellbore, the step of cementing creating a pressure-bearing seal between the periphery of the window and the liner.

A primary advantage of this aspect of the present invention is that the diverter can be set, the window formed and the lateral wellbore drilled in a single trip. This is a significant advantage over the prior art, as it is expensive and time-consuming to make multiple trips. The diverter is preferably left in the main well flow conductor throughout the remaining life of the well.

In a preferred embodiment of this aspect of the present invention, the diverter is coupled to the drillstring via a severable link. As before, when the diverter is set (either by hydraulically setting a packer, engaging a locating key in a nipple or otherwise), weight or tension is placed on the drillstring to shear the severable link; the bit drops, contacting the slanted face of the diverter and is diverted to initiate the lateral wellbore.

In a preferred embodiment of this aspect of the present invention, the method further comprises the step of removing cement, or composite materials run in place in the soft centered, cement or composite material drillable core, injected into the soft centered, cement or composite material drillable core of the diverter to allow access to a distal portion of the main well flow conductor. In a more preferred embodiment, the method further comprises the step of boring through the soft centered, cement or composite material drillable core of the diverter to remove the cement or composite material located in the soft centered, cement or composite material drillable core.

When the liner is cemented into place, cement is forced into the interstices about the window and the liner, hydraulically sealing the liner to the main well flow conductor. By design, the cement also enters the soft centered, cement or composite material drillable core of the diverter, at least partially blocking the distal portion of the main well flow conductor. This cement must be removed to regain access to the distal portion.

Still another aspect of the present invention provides a system for creating a multilateral well, comprising: (1) means for diverting set at a prescribed position and a prescribed orientation in a main well flow conductor located within a main wellbore, (2) means, cooperable with the means for diverting, for boring through a sidewall of the main well flow conductor and into a material surrounding the main well flow conductor, the means for boring creating a window having a particular shape in the sidewall, the orientation of the means for diverting determining a lateral position of the window in the main well flow conductor, a lateral wellbore thereby being formed in the material and extending from the main wellbore, (3) means for lining the lateral wellbore, and (4) a pressure-bearing seal between the periphery of the window and the interface end of the liner, the liner cemented in place within the lateral wellbore.

Still yet another aspect of the present invention provides a system for creating a multilateral well, comprising: (1) means for diverting set having a soft centered drillable core at a prescribed position and a prescribed orientation in a main well flow conductor located within a main wellbore, the means for diverting severably coupled to an end of a drillstring, (2) means for boring through a sidewall of the main well flow conductor and into a material surrounding the main well flow conductor, the means for boring creating a window having a particular shape in the sidewall, the orientation of the means for diverting determining a lateral position of the window in the main well flow conductor, a lateral wellbore thereby being formed in the material and extending from the main wellbore, (3) means, cooperable with the means for diverting, for lining the lateral wellbore, and (4) a pressure-bearing seal between the periphery of the window and the liner, the liner cemented in place within the lateral wellbore.

Yet another aspect of the present invention provides a subterranean multilateral well structure, comprising: (1) a main well flow conductor located within a main wellbore, a sidewall of the main well flow conductor including a plurality of windows having a particular shape distributed along a length of the main well flow conductor, the windows having lateral orientations, (2) a plurality of lateral wellbores formed in material surrounding the main wellbore, the lateral wellbores extending from respective ones of the plurality of windows, (3) liners having interface ends cemented within each of the lateral wellbores, the interface ends of the liners adapted to contact peripheries of respective one of the windows in the sidewall and (4) pressure-bearing seals between the peripheries of the windows and the interface ends of the liners to thereby provide for (a) connectivity among the main wellbore and the lateral wellbores, (b) pressure-bearing sealing of the interface ends to the respective peripheries to allow selective isolation of a portion of the lateral wellbores and (c) subsequent selective access to the lateral wellbores.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a vertically foreshortened, highly schematic partial cross-sectional view of a main casing of a new well after the step of setting and prior to the step of boring according to a first embodiment of the present invention;

FIG. 3 illustrates a vertically foreshortened, highly schematic partial cross-sectional view of the main casing of FIG. 1 after the step of boring and prior to the step of lining according to the first embodiment of the present invention;

FIG. 4 illustrates a vertically foreshortened, highly schematic partial cross-sectional view of the main casing of FIG. 3 after the step of cementing according to the first embodiment of the present invention;

FIG. 5 illustrates a vertically foreshortened, highly schematic partial cross-sectional view of the main casing of FIG. 4 with a slidable flow control member having ports therein proximate the window according to the first embodiment of the present invention;

FIG. 7 illustrates a vertically foreshortened, highly schematic partial cross-sectional view of a main casing of a new well after the step of setting and prior to the step of boring according to a second embodiment of the present invention;

FIG. 8 illustrates a vertically foreshortened, highly schematic partial cross-sectional view of the main casing of FIG. 7 after the step of cementing according to the second embodiment of the present invention;

DETAILED DESCRIPTION

Again, one aspect of the present invention provides an improved method of creating a multilateral well comprising the steps of: (1) setting a diverter at a prescribed position and a prescribed orientation in a main well flow conductor located within a main wellbore, (2) boring through a sidewall of the main well flow conductor and into a material surrounding the main well flow conductor, the boring creating a window having a particular shape in the sidewall, the orientation of the diverter determining a lateral position of the window in the main well flow conductor, a lateral wellbore thereby being formed in the material and extending from the main wellbore, (3) lining the lateral wellbore with a liner, the liner having an interface end, and (4) cementing the liner in place within the lateral wellbore, the step of cementing creating a pressure-bearing seal between the periphery of the window and the interface end of the liner.

Figure 2:
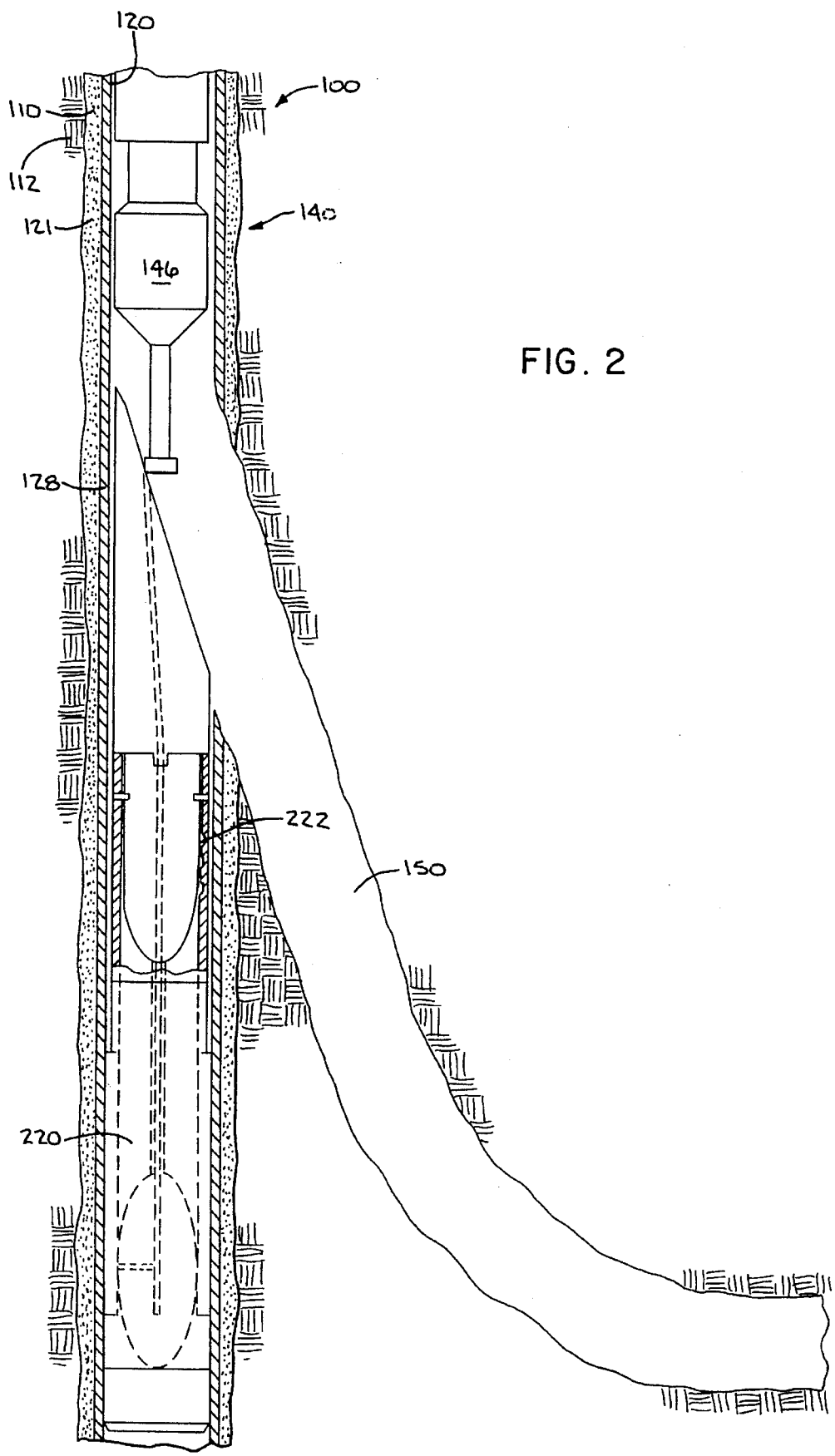
FIG. 2 illustrates a vertically foreshortened, highly schematic partial cross-sectional view of a main casing of an existing well after the step of setting and prior to the step of boring according to the first embodiment of the present invention.

Referring initially to FIG. 1, illustrated is a vertically foreshortened, highly schematic partial cross-sectional view of a main casing of a new well after the step of setting and prior to the step of boring. The present invention is employable in both new and existing well environments. FIG. 1 is therefore a new well and FIG. 2 is an existing well.

FIG. 1 shows a well, generally designated 100. The well 100 comprises a main wellbore 110 that has been drilled generally vertically into earth 112 (more generally referred to as "material surrounding the main wellbore") in a conventional manner. A main casing 120 is set into the main wellbore with cement 121, again in a conventional manner. Since the well 100 is a new well, the main casing 120 has been set in place with a nipple 122 having a profile 124 on an inner surface thereof. In a manner to be described, the profile 124 allows subsequent location of, and engagement with, the nipple 122. The main casing 120 further includes a helical guide 126 that is illustrated as being a helical recess machined or otherwise formed into an inner surface of the main casing 120. Alternatively, the helical guide 126 may be made integral with the nipple.

Finally, the main casing 120 includes a section or joint 128 composed of a composite material. For purposes of the present discussion, "composite material" shall be defined as a nonmetallic, perhaps heterogeneous, typically woven-fiber structure captured in a resin matrix. Examples of composite materials are carbon fiber composites and glass fiber composites. Composite materials are widely known for both their extreme lightness and strength. They are also known for their fragility and tendency to abrade and delaminate locally when subjected to frictional forces. In many applications, this is disadvantageous. However, in the given application, it is desirable to provide a joint 128 that may be drilled through with a drilling bit, rather than a special metal milling bit. This reduces the number of trips required to create a lateral wellbore, thereby enhancing both time and cost factors.

A diverter assembly 130 and accompanying diverter 132 are lowered into the main casing 120. The purpose of the diverter assembly 130 is to position the diverter 132 at a prescribed position and prescribed orientation within the main casing 120. In the illustrated embodiment, the diverter 132 is a whipstock. Whipstocks are a special type of diverter having a hardened slanted face 133 thereon adapted to divert a boring tool. After milling and/or drilling, an ordinary, non-hardened diverter may be used. However, the scope of the present invention is not limited to the use of hardened whipstocks for diversion of the boring bit.

The diverter assembly 130 includes a body portion 134 having a generally conical end 136. The body portion 134 has slots (not referenced) therein running vertically, as shown, along the body portion 134. Each of the slots is adapted to receive one of a selectable number of locator keys 138. The locator keys 138 have a profile formed therein designed to conform to the profile 124 on the nipple 122. Finally, a spring-loaded orienting lug 139 is mounted within the body portion 134 and biased such that a pointed end of the orienting lug 139 bears resiliently against an inner surface of the main casing 120 as the diverter assembly 130 is lowered through the main casing 120.

As the diverter assembly 130 approaches each nipple in the main casing 120, the orienting lug 139 engages with a helical guide associated with each nipple, causing the diverter 132 to rotate into a correct orientation. If the locator key 138 on the diverter assembly 130 matches the nipple profile 124, the diverter assembly 130 engages the nipple and halts. The relative rotational relationship of the diverter 132 and the diverter assembly 130 are preset such that, when the locator key 138 engages and the diverter assembly 130 halts, the helical guide 136 has caused the diverter 132 to rotate into precisely the prescribed orientation within the main casing 120. This prescribed location (depth, in the case of a vertical main wellbore 110) and prescribed orientation allow very precise drilling of lateral wellbores, thereby enhancing production from the oilfield.

If the locator key 138 does not match the profile 124, the locator key 138 does not engage the nipple 122, the diverter assembly 130 continues to travel and the orienting lug 139 disengages the helical guide 136, conventionally by means of a ramp (not shown) at a lower end of the helical guide 136. Thus, nipples containing many unique profiles may be placed at selected locations along the length of the main casing 120, allowing diverter assemblies or any other objects to engage with only one of the selected locations as a function of the locator key chosen for the object. The present invention makes advantageous use of this locating system to create and subsequently access lateral wellbores in a reliable manner.

In the illustrated embodiment, the steps of setting and boring are accomplished in a single trip. To accomplish this, the diverter 132 is coupled to a drillstring (generally designated 140 and comprising sections of drillpipe 142, drillpipe joints 144 and a boring bit 146) via a severable link 148, such as a shear pin.

For purposes of the present invention, the term "boring" is generic and includes the terms "milling" and "drilling." Milling refers specifically to the operation of boring or cutting through metal. Drilling refers to boring or cutting through nonmetal, including earth or composite material. As will be illustrated in greater detail, the boring bit 146 may be a drilling bit, such as a rock bit, when the well 100 is new. The boring bit 146 is required to be a milling bit when the well 100 is existing.

The drillstring 140 and the diverter assembly 130 are lowered into the main casing 120 as a single unit. When the locator key 138 engages the appropriate nipple 122, the diverter assembly 130 halts as described above. Weight is placed on the drillstring 140, causing the severable link to shear; the boring bit 146 drops relative to the diverter 132, contacting the slanted face 133 of the diverter 132 and is thereby diverted to initiate drilling of a lateral wellbore 150. Conventional bit technology is employed to drill through the composite joint 128 and into the surrounding earth, thereby eliminating the need for separate trips to (1) mill a window into a metal casing joint and (2) drill into earth.

In an alternative embodiment of the present invention, the joint 128 may be composed of a metallic material and have a preformed window of a prescribed shape formed therein. In this embodiment, the window has a cover composed of a composite material located thereon. A drilling bit would be used to drill through the cover and into the surrounding earth 112. The window would thereby be opened and would have the prescribed shape. Therefore, rather than forming the entire joint of composite material, a composite-covered window is preformed in an otherwise steel casing. The advantage of this embodiment over the one previously described is that the window that results after drilling has a known geometry. This is very important, as the sealing of the joint between the liner and the main casing may be ineffective if the window is not shaped as expected. The previously-described embodiment may give rise to an imperfectly-shaped window and resulting sealing complications.

Turning now to FIG. 2, illustrated is a vertically foreshortened, highly schematic partial cross-sectional view of a main casing 120 of an existing well 100 after the step of setting and prior to the step of boring.

The differences are as follows. First, there is no nipple 122 preset into the main casing 120, since the main casing 120 was set in place with no prior knowledge of a need for such nipple 122. Therefore, a conventional permanent hydraulic packer 220 is used to establish a location for the desired lateral wellbore.

A hydraulic hose couples the hydraulic packer 220 to a source of hydraulic pressure (not shown), typically located at the surface. Using pipe measuring techniques and MWD technology, the hydraulic packer 220 is set in a prescribed location and orientation. A nipple 222, integral with the hydraulic packer, preferably includes an integral helical guide (not shown). Since the hydraulic packer 220 will preferably be left in place throughout the remaining life of the well 100, the nipple 222 and guide serve as a permanent reference for the lateral wellbore, allowing subsequent selective access, as described. Alternatively, it is contemplated that the packer may be mechanically set (slidably) by conventional reciprocating means.

The diverter 132 (whipstock) and diverter assembly 130 (including the hydraulic packer 220) are lowered into place as before, preferably attached via the severable link 148 to the drillstring 140, thereby minimizing trips. When accomplishing the steps of setting the hydraulic packer 220 and boring the lateral wellbore in a single trip, the hydraulic hose preferably leads from the drillstring 140 to the hydraulic packer 220, allowing the packer 220 to be set. Once the packer 220 is set and weight applied to the drillstring to sever the severable link 148, it is apparent that the boring action of the boring bit 146 destroys a portion of the hydraulic hose. As the hose is no longer required, this is of no concern.

The joint 128 is a conventional metal joint, rather than a composite joint, since, again, the main casing 120 was set in place with no prior knowledge of a need for such composite joint. The boring bit 148 is now required to be a milling bit, as the joint 128 is metal.

Those skilled in the art should understand that the present invention is not limited to casings. In fact, the present discussion often uses the more generic term "well flow conductor," as production tubing and the like may also be breached to create lateral wellbores. Those of skill in the art will further understand that the terms "casing" and "liner" are rather interchangeable, although to some of skill in the art, "liner" has come to refer to casing that does not extend fully to the surface of the well 100. These terms are therefore used somewhat interchangeably.

Once the boring bit 146 mills through the main casing 120, the drillstring must be raised and refitted with a drilling bit to drill the lateral wellbore 150. In some cases, intermediate trips may be required to deburr or otherwise finish the window milled into the main casing 120.

The present invention can thus operate in the environment of an existing well. This is a significant advantage that the present invention enjoys over the prior art, as the present invention, to be employed, does not require a particular well structure (wherein lateral wellbores bear a predetermined relationship to the main wellbore) or special preexisting devices, such as nipples or special joints, in the main casing 120. Thus, lateral wellbores can be drilled, lined and hydraulically sealed to an existing cased main wellbore, dramatically enhancing production levels and the economic viability of existing wells.

Turning now to FIG. 3, illustrated is a vertically foreshortened, highly schematic partial cross-sectional view of the main casing 120 of FIG. 1 after the step of boring and prior to the step of lining. Several changes have taken place since FIG. 1. First, the diverter 132 and diverter assembly 130 have been retrieved from the main casing 120 in a conventional manner.

In place of the diverter 132 and diverter assembly 130, a slidable flow control device 310 and an associated flow control device assembly 320 are engaged into the nipple 122 as described above. Of course, were the well 100 an existing well, a permanent hydraulic packer and associated nipple would take the place of the nipple 122. The flow control device 310 is illustrated as having a plurality of ports 312 therethrough that will function to control fluid communication to the lateral wellbore 150 in a manner to be described. The flow control device 310 is adapted to rotate or slide longitudinally with respect to the flow control device assembly 320 to permit or deny access to the lateral wellbore 150 when in a lower or upper position, respectively. (Only the longitudinally-slidable embodiment is shown, the rotating embodiment being apparent to those of skill in the art, given the present teachings.)

The present invention is also operable with a portless flow control device 310. In the upper position, the flow control device 310 serves to block fluid communication to the lateral wellbore 150, thereby sealing the lateral wellbore 150.

The slidable flow control device 310 and associated flow control device assembly 320 have a soft centered, cement or composite material drillable core to allow access to portions of the main casing 120 that are beneath the device 310 and assembly 320. A further profile 312 is located on an inner surface of the flow control device 310. The profile 312 is adapted to accept an engaging key of a diverter assembly 330 coupled to a diverter 332. The diverter 332 does not require a hardened face, as milling and/or drilling is complete. By virtue of the profiles 124, 312 and their associated orienting lugs (not shown for simplicity's sake), the diverter 332 is in a proper location and orientation for access to the lateral wellbore 150.

Finally, the flow control device assembly 320 includes an upper section 322 (a "preformed window member") having a pre-milled window 324 therein. Those of skill in the art should understand that a corresponding window 326 previously drilled or milled in the joint 128 may have uneven or rough edges, resulting in an unknown geometry or shape and giving rise to an unreliable seal. Although the window 326 can be employed to attach the liner that will eventually be inserted into the lateral wellbore 150, one of the points of novelty of the present invention is that the upper section 320 and its premilled window 324 can be used to yield a window having a known, reliable geometry and shape for attachment of the liner.

A liner 340 is shown entering the upper section 322. The liner 340 may be a perforated, a slotted or a prepacked liner. The diverter 332 guides the liner into the lateral wellbore 150. Using conventional washdown techniques, the liner 340 is pushed through the lateral wellbore 150 until the liner 340 reaches a final position within the lateral wellbore. An advantage of the present invention is that it is compatible with conventional washdown techniques, thereby ensuring that the liner 340 is fully positioned within the lateral wellbore 150 prior to cementing.

Turning now to FIG. 4, illustrated is a vertically foreshortened, highly schematic partial cross-sectional view of the main casing 120 of FIG. 3 after the step of cementing. The liner 340 has been washed down into a final position within the lateral wellbore 150. A point of novelty of the present invention concerns an interface end 342 of the liner 340. The interface end 342 is preferably preformed with a complete or partial flange 344 extending radially outwardly from the interface end 342. The flange 344 is adapted to mate with a periphery of the preformed window 324 in the upper section 322. Other structures for mating the interface end to the window 324 periphery are within the scope of the present invention, such as crenelated protrusions.

In FIG. 4, the washdown tool (not shown) has been retrieved and a cementing tool 410 has been lowered in its place. The cementing tool 410 is adapted to inject cement into an annular space 122 between the main casing 120, the liner 340 and a wall of the main wellbore 110. The cement fills interstices between the periphery of the window 324 and the interface end 342 of the liner 340 to create a pressure-bearing seal, as shown.

Using conventional cementing techniques, the cementing tool 410 is lowered into the main casing 120 and to a location substantially in alignment with either main casing ports 326 or liner ports 346. FIG. 4 shows the latter of these two possibilities. A prescribed quantity of cement is injected through the ports 346 into the annular space. The cement flows toward and into the interstices 344 to effect the seal.

Injecting the cement through the ports 346 in the liner 340 offers the advantage of allowing the cement to flow upwards, discouraging voids from forming in the cement. Injecting the cement through the ports 326 in the main casing 120 injects cement closer to the interstices 344 than the first alternative, thereby offering the advantage of ensuring that the cement that perfects the seal is relatively free from debris that may be entrained were the cement forced to travel a greater distance in the wellbores 110, 150.

Preferably, the cement is an elastomeric cement. During the lifetime of the well 100, thermal, geologic and other stresses may shift the liner interface end 342 with respect to the periphery of the window 324. A cement having elastomeric properties can accommodate minor shifting, thereby maintaining the integrity of the seal. Those of skill in the art should understand, however, that ordinary drilling cement may be preferable to elastomeric cement, depending upon geological or cost considerations.

Turning now to FIG. 5, illustrated is a vertically foreshortened, highly schematic partial cross-sectional view of the main casing 120 of FIG. 4 with the slidable flow control device 310 having ports 412 therein proximate the window. The flow control device 310 is rotated or shifted longitudinally in a manner that has been described. In its upper position, the ports 412 allow fluid communication and disallow tool reentry into the lateral wellbore 150. In its lower position (shown previously), reentry is allowed. Since the slidable flow control device 310 has a soft centered, cement or composite material drillable core, access to the lower portions of the main casing 120 may be had by tools having a diameter smaller than that of the soft centered, cement or composite material drillable core.

The steps illustrated in FIGS. 1 through 4 may be repeated at other positions and orientations with the main casing 120 to yield a plurality of lined lateral wellbores formed in the earth 112 and extending from the main wellbore 110.

Figure 6:
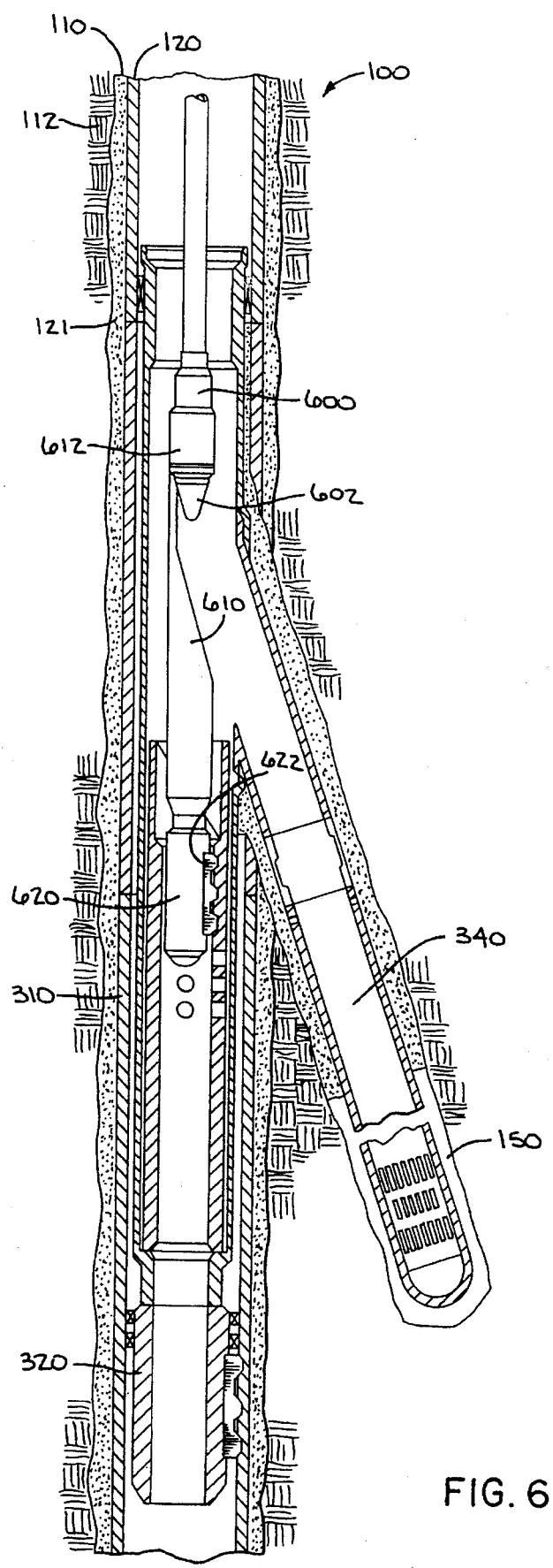
FIG. 6 illustrates a vertically foreshortened, highly schematic partial cross-sectional view of the main casing of FIG. 5 with the slidable flow control device axially displaced thereby providing coiled tube rig rework access to the lateral wellbore according to the first embodiment of the present invention.

Turning now to FIG. 6, illustrated is a vertically foreshortened, highly schematic partial cross-sectional view of the main casing 120 of FIG. 5 with the slidable flow control member 310 axially displaced into its lower position, thereby providing coiled tube rig rework access to the lateral wellbore 150.

The diverter 332 of FIG. 5 is removed. Alternatively, the diverter 332 may remain, if it has a soft centered, cement or composite material drillable core. The full drilling rig at surface level (not shown) is also removed, as the present invention does not require a full rig for rework of the well 100. Instead, a coiled tubing service tool 600 is lowered from a coiled tube rig at surface level (also not shown). The service rig 600 may be fitted with one of many different rework or maintenance tools 602. Lowered with the service tool 600 are a diverter 610 and an associated diverter assembly 620. Again, the diverter assembly 620 has a key 622 corresponding to a particular profile set in the main casing 120. The key 622 engages, displacing the flow control device 310 into its lower position and opening the lateral wellbore 150 for tool access. The diverter 610 is also set at a prescribed location and a prescribed orientation for entry. The service tool 600 disengages with a no-go retrieving ring 612 to divert into the lateral wellbore 150. When the service tool 600 is raised, the diverter 610 and diverter assembly 620 are also raised. The flow control device 310 either automatically raises or is subsequently manually raised to block the lateral wellbore 150.

Without the diverter 610 and diverter assembly 620, the service tool is allowed to pass through the soft centered, cement or composite material drillable core of the flow control device 310 and the flow control device assembly 320 to access the distal portion of the main casing 120 with a coiled tube rig. This is a significant advantage of the present invention.

From the above, it is apparent that the first aspect of the present invention provides an improved method of creating a multilateral well and an improved multilateral well structure. The method comprises the steps of: (1) setting a diverter at a prescribed position and a prescribed orientation in a main well flow conductor located within a main wellbore, (2) boring through a sidewall of the main well flow conductor and into a material surrounding the main well flow conductor, the boring creating a window having a particular shape in the sidewall, the orientation of the diverter determining a lateral position of the window in the main well flow conductor, a lateral wellbore thereby formed in the material and extending from the main wellbore, (3) lining the lateral wellbore with a liner, and (4) cementing the liner in place within the lateral wellbore, the step of cementing creating a pressure-bearing seal between the periphery of the window and the interface end of the liner.

Another aspect of the present invention provides an improved method of creating a multilateral well and an improved multilateral well structure comprising the steps of: (1) setting a diverter having a soft centered, cement or composite material drillable core at a prescribed position and a prescribed orientation in a main well flow conductor located within a main wellbore, the diverter severably coupled to an end of a drillstring, (2) boring through a sidewall of the main well flow conductor and into a material surrounding the main well flow conductor with a boring tool coupled to an end of the drillstring, the boring creating a window having a particular shape in the sidewall, the orientation of the diverter determining a lateral position of the window in the main well flow conductor, a lateral wellbore thereby being formed in the material and extending from the main wellbore, the steps of setting and boring performed in a single trip, (3) lining the lateral wellbore with a liner, and (4) cementing the liner in place within the lateral wellbore, the step of cementing creating a pressure-bearing seal between the periphery of the window and the liner.

Turning now to FIG. 7, illustrated is a vertically foreshortened, highly schematic partial cross-sectional view of a main casing of a new well after the step of setting and prior to the step of boring according to the second embodiment of the present invention.

As in FIG. 1 of the first embodiment, the drillstring 140 is lowered longitudinally into the main casing 120. The diverter 132 is coupled to the drillstring 140 via a severable link 148. However, as opposed to the first embodiment, the diverter 132 has a soft centered, cement or composite material drillable core. When the locator key 138 engages the appropriate nipple 122, the diverter 132 halts, as described above. Weight is placed on the drillstring 140, causing the severable link 148 to shear; the boring bit 146 drops relative to the diverter 132, contacting a periphery of the slanted face of the diverter 132 and is thereby diverted to initiate drilling of a lateral wellbore 150. Conventional bit technology is employed to drill through the composite joint 128 and into the surrounding earth 112, thereby eliminating the need for separate trips to (1) mill a window into a metal casing joint and (2) drill into earth.

In an alternative embodiment of the present invention, the joint 128 may be composed of a metallic material and have a preformed window of a prescribed shape formed therein. In this embodiment, the window has a cover composed of a composite material located thereon. A drilling bit would be used to drill through the cover and into the surrounding earth 112. The window would thereby be opened and would have the prescribed shape. Therefore, rather than forming the entire joint of composite material, a composite-covered window is preformed in an otherwise steel casing. The advantage of this embodiment over the one previously described is that the window that results after drilling has a known geometry. This is very important, as the sealing of the joint between the liner and the main casing may be ineffective if the window is not shaped as expected. The previously-described embodiment may give rise to an imperfectly-shaped window and resulting sealing complications.

In a further alternative, applicable in the environment of an existing well (and akin to FIG. 2, except for the substitution of a diverter having a soft centered, cement or composite material drillable core), the composite joint 128 is, instead, a metallic joint and there is no nipple 122 preset into the main casing 120, since the main casing 120 was set in place with no prior knowledge of a need for such nipple 122. In this environment, the drillstring 140 is lowered with a whipstock having a hydraulic packer attached thereto. Using conventional pipe measuring techniques, the depth of the packer may be gauged and, using MWD technology, the orientation of the packer may be gauged to set the packer hydraulically at the appropriate location and orientation within the main casing 120. As with the diverter 132, the packer preferably has a soft centered, cement or composite material drillable core.

The diverter 132 (whipstock) is lowered into place as before, attached via the severable link 148 to the drillstring 140, thereby minimizing trips. Because the joint 128 is a conventional metal joint, rather than a composite joint, the boring bit 148 is now required to be a milling bit, as the joint 128 is metal.

Once a window is formed in the main casing 120, whether by drilling through a composite joint 128 or a metallic joint 128 with a composite window (as in a new well) or by milling through a metallic joint 128 (as in an existing well), the method the second embodiment of the present invention is the same for new and existing wells.

Turning now to FIG. 8, illustrated is a vertically foreshortened, highly schematic partial cross-sectional view of the main casing of FIG. 7 after the step of cementing according to the second embodiment of the present invention. The liner 340 is shown in place. Conventional cementing techniques are employed to inject cement into the interstices between the liner 340 and the lateral wellbore 150. This cement may be elastomeric or nonelastomeric, as before. The cement is injected until it completely surrounds the liner 340, including that portion of the liner that extends to within the main casing 120. This hydraulically seals the liner 340 to the main casing 120, providing the basis for subsequent selective isolation of the lateral wellbore 150, if desired. As a by-product of this cementing step, as is shown in FIG. 8, some of the cement enters and blocks the soft centered, cement or composite material drillable core of the diverter 132. This cement must eventually be removed to gain access to distal portions of the main casing 120 (those portions shown as beneath the junction of the liner 340 and the main casing 120.

Figure 9:
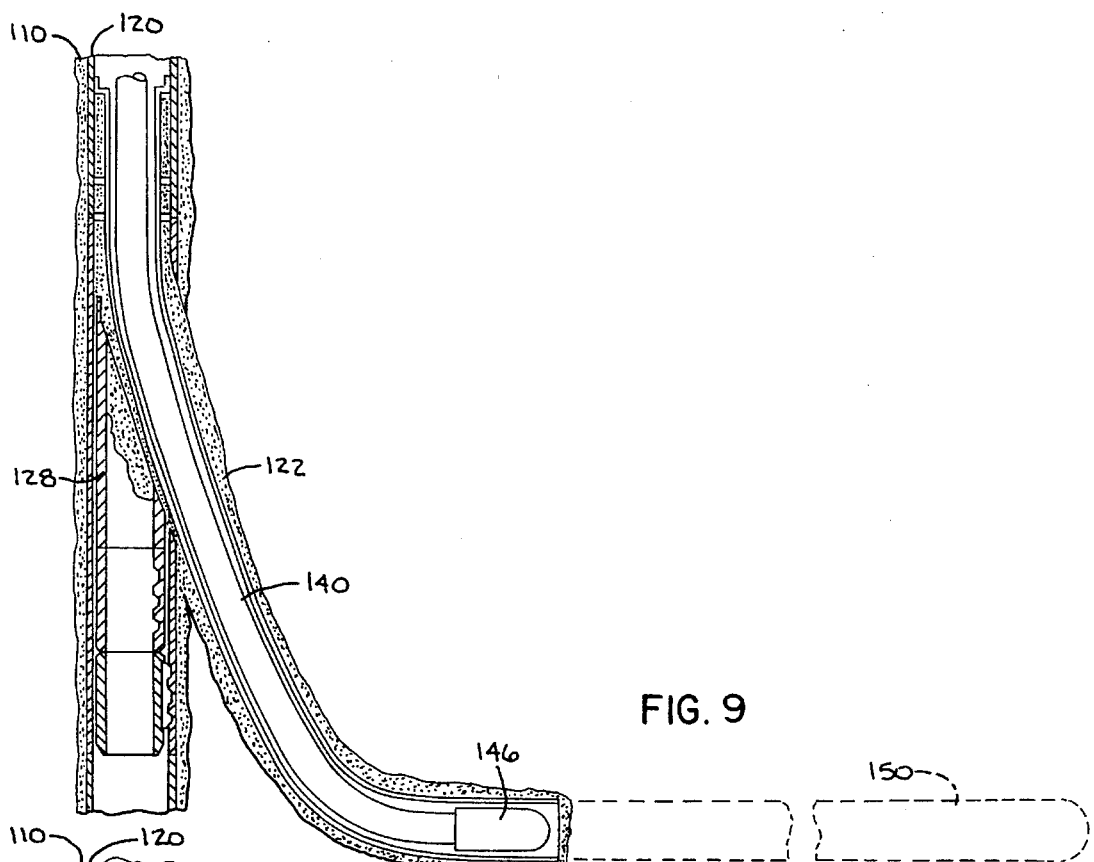
FIG. 9 illustrates a vertically foreshortened, highly schematic partial cross-sectional view of the main casing of FIG. 8 after the step of boring a subsequent wellbore according to the second embodiment of the present invention.

Turning now to FIG. 9, illustrated is a vertically foreshortened, highly schematic partial cross-sectional view of the main casing of FIG. 8 after the step of boring a subsequent wellbore according to the second embodiment of the present invention. In FIG. 9, it has become desirable to extend the lateral wellbore 150. Accordingly, an open hole portion (shown in broken line) of the lateral wellbore 150 is drilled with a conventional drilling bit.

Figure 10:
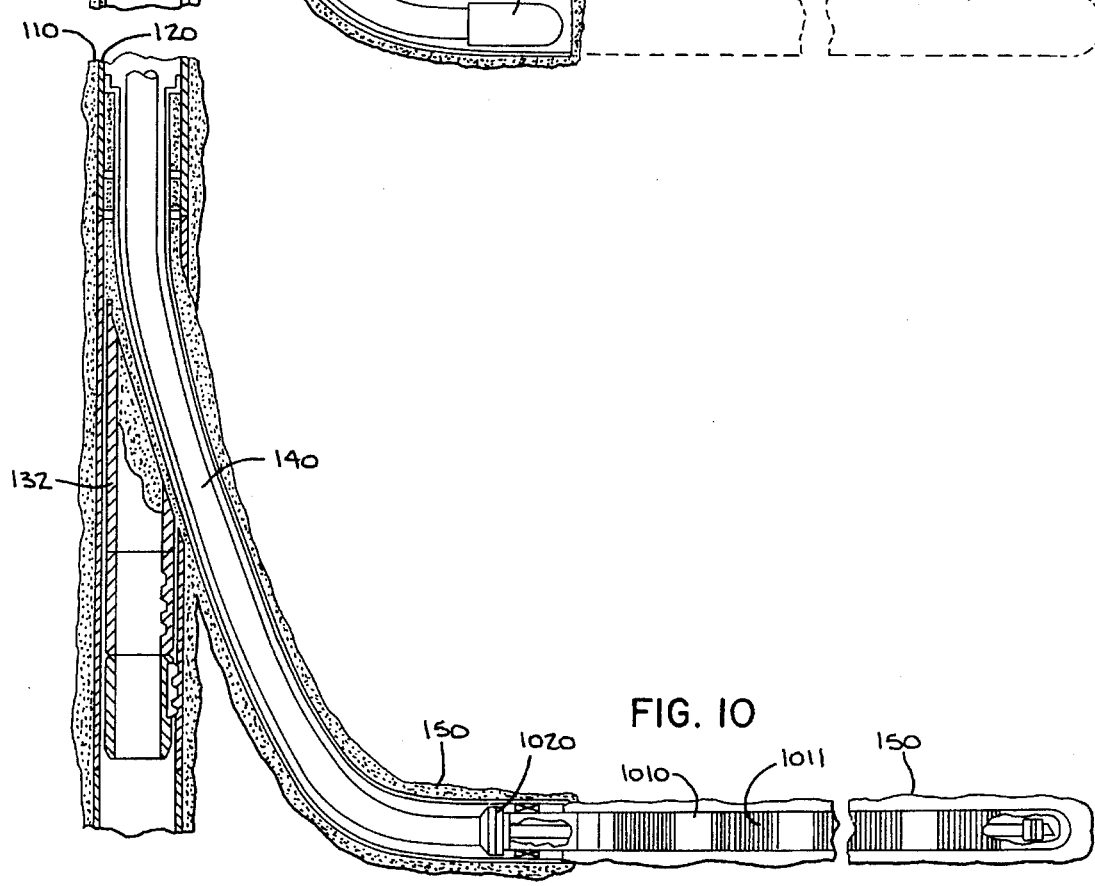
FIG. 10 illustrates a vertically foreshortened, highly schematic partial cross-sectional view of the main casing of FIG. 9 after the step of lining the subsequent wellbore according to the second embodiment of the present invention.

Turning now to FIG. 10, illustrated is a vertically foreshortened, highly schematic partial cross-sectional view of the main casing of FIG. 9 after the step of lining the subsequent wellbore according to the second embodiment of the present invention. After extension of the lateral wellbore 150, a prepacked screen 1010 having perforated portions 1011 is set into place with a conventional running tool 1020 using conventional washdown techniques. The prepacked screen 1010 allows production fluids to enter the liner 340 and the main casing 120, as desired.

Figure 11:
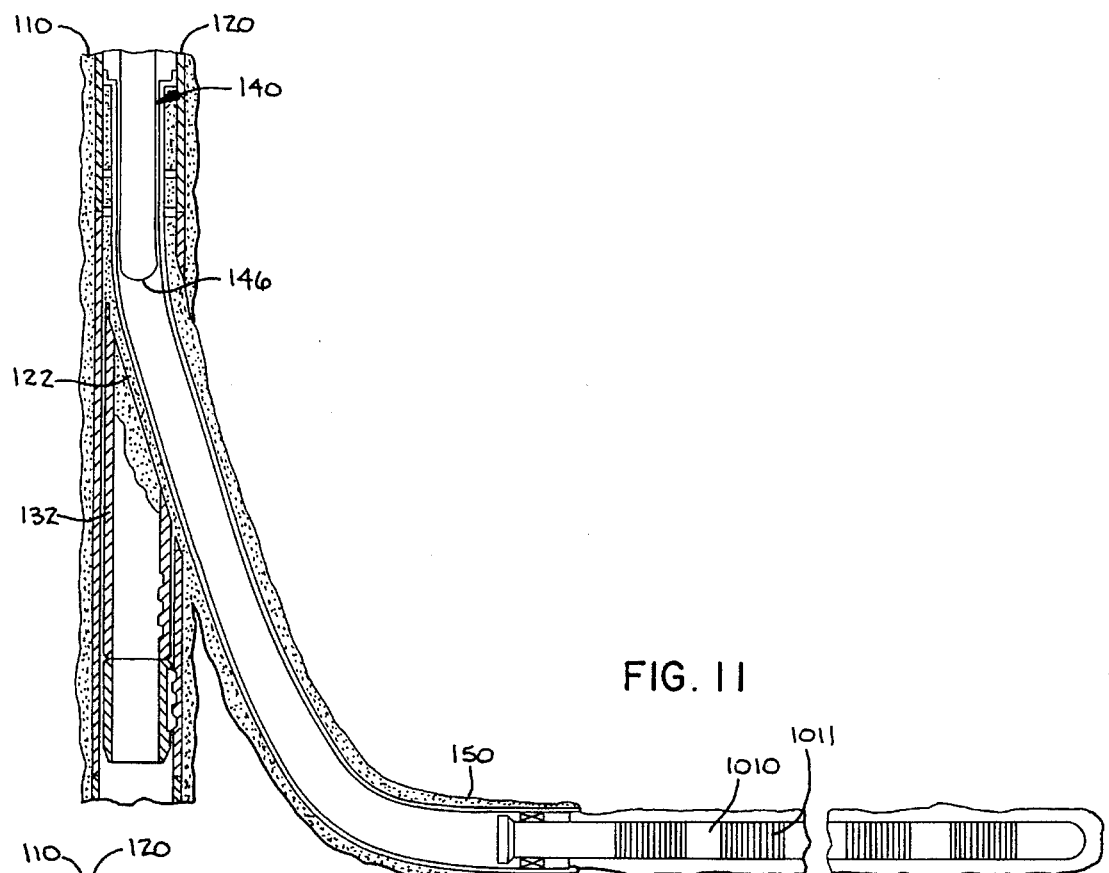
FIG. 11 illustrates a vertically foreshortened, highly schematic partial cross-sectional view of the main casing of FIG. 10 before the step of boring through the soft centered, cement or composite material drillable core of the diverter according to the second embodiment of the present invention.

Turning now to FIG. 11, illustrated is a vertically foreshortened, highly schematic partial cross-sectional view of the main casing of FIG. 10 before the step of boring through the soft centered, cement or composite material drillable core of the diverter according to the second embodiment of the present invention. As previously mentioned, because the step of cementing the liner 340 into place (FIG. 8) causes a blocking of the soft centered, cement or composite material drillable core of the diverter 132, it is necessary to remove the cement (and a portion of the liner 340) that blocks the soft centered, cement or composite material drillable core to reestablish access to the distal portion of the main casing 120. Accordingly, on a subsequent trip of the drillstring 140, a boring bit 146 is employed to bore through that portion of the liner 340 and the blocking cement.

Figure 12:
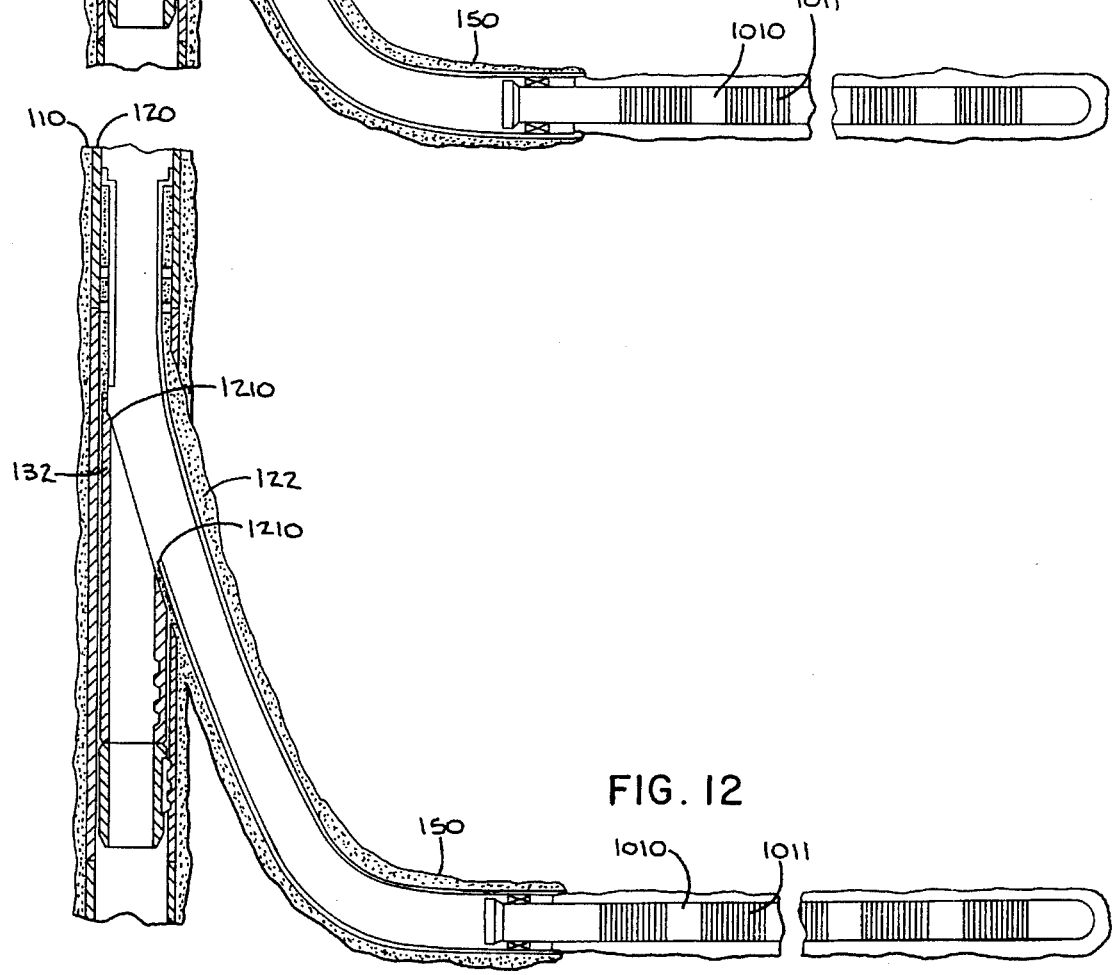
FIG. 12 illustrates a vertically foreshortened, highly schematic partial cross-sectional view of the main casing of FIG. 11 after the step of boring through the soft centered, cement or composite material drillable core of the diverter according to the second embodiment of the present invention.

Turning now to FIG. 12, illustrated is a vertically foreshortened, highly schematic partial cross-sectional view of the main casing of FIG. 11 after the step of boring through the soft centered, cement or composite material drillable core of the diverter according to the second embodiment of the present invention. As seen in FIG. 12, access to the distal portion of the main casing 120 is reestablished without compromising access to the liner 340 within the lateral wellbore.

Finally, a rotatable or slidable flow control device, such as that illustrated in FIGS. 5 and 6 may be employed to control flow to and from the lateral wellbore 150, thereby allowing selective isolation of the lateral wellbore 150.

From the above, it is apparent that a second aspect of the present invention provides an improved method of creating a multilateral well and an improved multilateral well structure. The method comprises the steps of: (1) setting a diverter having a soft centered, cement or composite material drillable core at a prescribed position and a prescribed orientation in a main well flow conductor located within a main wellbore, the diverter severably coupled to an end of a drillstring, (2) boring through a sidewall of the main well flow conductor and into a material surrounding the main well flow conductor with a boring tool coupled to an end of the drillstring, the boring creating a window having a particular shape in the sidewall, the orientation of the diverter determining a lateral position of the window in the main well flow conductor, a lateral wellbore thereby being formed in the material and extending from the main wellbore, the steps of setting and boring preferably performed in a single trip, (3) lining the lateral wellbore with a liner, and (4) cementing the liner in place within the lateral wellbore, the step of cementing creating a pressure-bearing seal between the periphery of the window and the liner. As an alternative to the diverter being severably coupled, it is contemplated that a soft center whipstock may be run on a separate trip.

Although the present invention and its advantages have been described in detail, those skilled in the art should understand that they can make various changes, substitutions and alterations herein without departing from the spirit and scope of the invention in its broadest form.

What is claimed is:

1. A method of creating a multilateral well, comprising the steps of:

setting a diverter at a prescribed position and prescribed orientation in a main well flow conductor located within a main wellbore; milling a window through a sidewall of said main well flow conductor with a milling tool and drilling into said material surrounding said main well flow conductor with a drilling tool, said sidewall being composed of a metallic material;

lining said lateral wellbore with a liner, said liner having an interface end, said interface end adapted to contact a periphery of said window in said sidewall; and cementing said liner in place within said lateral wellbore, said step of cementing creating a pressure-bearing seal between said periphery of said window and said interface end of said liner.

2. The method as recited in claim 1, further comprising the step of setting said main well flow conductor in said main wellbore, said main well flow conductor including a nipple for locating said diverter at said prescribed position in said main well flow conductor.

3. The method as recited in claim 1, further comprising the step of setting said main well flow conductor in said main wellbore, said main well flow conductor including a helical guide therein for rotating said diverter into said prescribed orientation in said main well flow conductor.

4. The method as recited in claim 1, further comprising the step of setting a packing device within said main well flow conductor, said packing device including a profile for locating said diverter at said prescribed position and said prescribed orientation in said main well flow conductor.

5. The method as recited in claim 1, further comprising the step of injecting said cement into an annular space between said main well flow conductor and a wall of said main wellbore, said cement filling interstices between said periphery of said window and said interface end of said liner to create said pressure-bearing seal.

6. The method as recited in claim 1, further comprising the step of removing said diverter from within said main well flow conductor to thereby allow access to a distal portion of said main well flow conductor.

7. The method as recited in claim 1, further comprising the step of accessing a selected one of a distal portion of said main well flow conductor and said liner within said lateral wellbore with a coiled tube rig.

8. The method as recited in claim 1, further comprising the step of injecting said cement into an annular space between said main well flow conductor and a wall of said main wellbore from ports located in said main well flow conductor.

9. The method as recited in claim 1, further comprising the step of injecting an elastomeric cement into an annular space between said main well flow conductor and a wall of said main wellbore thereby creating a flexible seal between said main well flow conductor and said liner.

10. The method as recited in claim 1, wherein said step of lining comprises the step of washing down said liner until said liner reaches a final position within said lateral wellbore and said interface end contacts said periphery of said window.

11. The method as recited in claim 1, wherein said step of setting comprises the step of setting a packing device in said main well flow conductor, a hydraulic hose from a boring tool allowing said packing device to be hydraulically set.

12. A method of creating a multilateral well, comprising the steps of:

setting a diverter at a prescribed position and prescribed orientation in a main well flow conductor located within a main wellbore;

boring through a sidewall of said main well flow conductor and into a material surrounding said main well flow conductor, said orientation of said diverter determining a lateral position of a window in said main well flow conductor, a lateral wellbore thereby being formed in said material and extending from said main wellbore;

lining said lateral wellbore with a liner, said liner having an interface end, said interface end adapted to contact a periphery of said window in said sidewall;

cementing said liner in place within said lateral wellbore, said step of cementing creating a pressure-bearing seal between said periphery of said window and said interface end of said liner; and setting said main well flow conductor in said main wellbore, said main well flow conductor including a joint composed of a composite material, said step of boring comprising the step of drilling through a sidewall of said joint and into said material surrounding said main well flow conductor with a single drilling tool.

13. A method of creating a multilateral well, comprising the steps of:

setting a diverter at a prescribed position and prescribed orientation in a main well flow conductor located within a main wellbore;

boring through a sidewall of said main well flow conductor and into a material surrounding said main well flow conductor, said orientation of said diverter determining a lateral position of a window in said main well flow conductor, a lateral wellbore thereby being formed in said material and extending from said main wellbore;

lining said lateral wellbore with a liner, said liner having an interface end, said interface end adapted to contact a periphery of said window in said sidewall;

cementing said liner in place within said lateral wellbore, said step of cementing creating a pressure-bearing seal between said periphery of said window and said interface end of said liner; and setting a preformed window member having a preformed window of a prescribed shape formed therein into said main well flow conductor.

14. A method of creating a multilateral well, comprising the steps of:

setting a diverter at a prescribed position and prescribed orientation in a main well flow conductor located within a main wellbore;

boring through a sidewall of said main well flow conductor and into a material surrounding said main well flow conductor, said orientation of said diverter determining a lateral position of a window in said main well flow conductor, a lateral wellbore thereby being formed in said material and extending from said main wellbore;

lining said lateral wellbore with a liner, said liner having an interface end, said interface end adapted to contact a periphery of said window in said sidewall;

cementing said liner in place within said lateral wellbore, said step of cementing creating a pressure-bearing seal between said periphery of said window and said interface end of said liner; and injecting said cement into an annular space between said main well flow conductor and a wall of said main wellbore from ports located in said liner.

15. A method of creating a multilateral well, comprising the steps of:

setting a diverter at a prescribed position and prescribed orientation in a main well flow conductor located within a main wellbore;

boring through a sidewall of said main well flow conductor and into a material surrounding said main well flow conductor, said orientation of said diverter determining a lateral position of a window in said main well flow conductor, a lateral wellbore thereby being formed in said material and extending from said main wellbore;

lining said lateral wellbore with a liner and cementing said liner in place within said lateral wellbore, said step of cementing creating a pressure-bearing seal between said periphery of said window and said interface end of said liner; and locating a slidable flow control device having ports therein proximate said window, said flow control device movable within said well flow conductor to expose said window thereby allowing access to said liner by a tool.

16. A method of creating a multilateral well, comprising the steps of:

setting a diverter at a prescribed position and prescribed orientation in a main well flow conductor located within a main wellbore;

boring through a sidewall of said main well flow conductor and into a material surrounding said main well flow conductor, said orientation of said diverter determining a lateral position of a window in said main well flow conductor, a lateral wellbore thereby being formed in said material and extending from said main wellbore;

lining said lateral wellbore with a liner and cementing said liner in place within said lateral wellbore, said step of cementing creating a pressure-bearing seal between said periphery of said window and said interface end of said liner; and locating a slidable flow control device proximate said window, said flow control device substantially blocking a flow of fluid between said liner and said main well flow conductor.

17. A method of creating a multilateral well, comprising the steps of:

setting a diverter having a soft centered drillable core at a prescribed position and a prescribed orientation in a main well flow conductor located within a main wellbore, said diverter severably coupled to an end of a drillstring;

milling a window through a sidewall of said main well flow conductor with a milling tool and drilling into said material surrounding said main well flow conductor with a drilling tool, said sidewall being composed of a metallic materia, said milling tool coupled to an end of said drillstring, said milling creating a window having a particular shape in said sidewall, said orientation of said diverter determining a lateral position of said window in said main well flow conductor, a lateral wellbore thereby being formed in said material and extending from said main wellbore, said steps of setting and boring performed in a single trip;

lining said lateral wellbore with a liner adapted to contact a periphery of said window in said sidewall; and cementing said liner in place within said lateral wellbore, said step of cementing creating a pressure-bearing seal between said periphery of said window and said liner.

18. The method as recited in claim 17, further comprising the step of setting said main well flow conductor in said main wellbore, said main well flow conductor including a nipple for locating said diverter at said prescribed position in said main well flow conductor.

19. The method as recited in claim 17, further comprising the step of setting said main well flow conductor in said main wellbore, said main well flow conductor including a helical guide therein for rotating said diverter into said prescribed orientation in said main well flow conductor.

20. The method as recited in claim 17, further comprising the step of setting a packing device within said main well flow conductor, said packing device including a profile for locating said diverter at said prescribed position and said prescribed orientation in said main well flow conductor.

21. The method as recited in claim 17, further comprising the step of boring through said hollow core of said diverter to remove cement located in said hollow core.

22. The method as recited in claim 17, wherein said step of setting said diverter comprises the step of setting a whipstock at said prescribed position and said prescribed orientation in said main well flow conductor, said whipstock having a slanted face thereon adapted to divert a boring tool.

23. The method as recited in claim 17, wherein said diverter is coupled to said drillstring via a severable link.

24. The method as recited in claim 17, further comprising the step of injecting said cement into an annular space between said main well flow conductor and a wall of said main wellbore, said cement filling interstices between said periphery of said window and said liner to create said pressure-bearing seal.

25. The method as recited in claim 17, further comprising the step of removing soft center core from said hollow core of said diverter.

26. The method as recited in claim 17, further comprising the step of accessing a selected one of a distal portion of said main well flow conductor and said liner within said lateral wellbore with a coiled tube rig.

27. The method as recited in claim 17, further comprising the step of injecting said cement into an annular space between said main well flow conductor and a wall of said main wellbore from ports located in said main well flow conductor.

28. The method as recited in claim 17, further comprising the step of injecting an elastomeric cement into an annular space between said main well flow conductor and a wall of said main wellbore thereby creating a flexible seal between said main well flow conductor and said liner.

29. The method as recited in claim 17, wherein said step of lining comprises the step of washing down said liner until said liner reaches a final position within said lateral wellbore and said interface end contacts said periphery of said window.

30. The method as recited in claim 17, wherein said step of setting comprises the step of setting a packing device in said main well flow conductor, a hydraulic hose from said drillstring allowing said packing device to be hydraulically set.

31. A method of creating a multilateral well, comprising the steps of:

setting a diverter having a soft centered drillable core at a prescribed position and a prescribed orientation in a main well flow conductor located within a main wellbore, said diverter severably coupled to an end of a drillstring;

boring through a sidewall of said main well flow conductor with a boring tool coupled to an end of said drillstring, said boring creating a window having a particular shape in said sidewall, said orientation of said diverter determining a lateral position of said window in said main well flow conductor, a lateral wellbore thereby being formed in said material and extending from said main wellbore, said steps of setting and boring performed in a single trip;

lining said lateral wellbore with a liner adapted to contact a periphery of said window in said sidewall;

cementing said liner in place within said lateral wellbore, said step of cementing creating a pressure-bearing seal between said periphery of said window and said liner setting said main well flow conductor in said main wellbore, said main well flow conductor including a joint composed of a composite material, said step of boring comprising the step of drilling through a sidewall of said joint and into said material surrounding said main well flow conductor with a single drilling tool.

32. A method of creating a multilateral well, comprising the steps of:

setting a diverter having a soft centered drillable core at a prescribed position and a prescribed orientation in a main well flow conductor located within a main wellbore, said diverter severably coupled to an end of a drillstring;

boring through a sidewall of said main well flow conductor with a boring tool coupled to an end of said drillstring, said boring creating a window having a particular shape in said sidewall, said orientation of said diverter determining a lateral position of said window in said main well flow conductor, a lateral wellbore thereby being formed in said material and extending from said main wellbore, said steps of setting and boring performed in a single trip;

lining said lateral wellbore with a liner adapted to contact a periphery of said window in said sidewall;

cementing said liner in place within said lateral wellbore, said step of cementing creating a pressure-bearing seal between said periphery of said window and said liner; and injecting said cement into an annular space between said main well flow conductor and a wall of said main wellbore from ports located in said liner.

33. A method of creating a multilateral well, comprising the steps of:

setting a diverter having a soft centered drillable core at a prescribed position and a prescribed orientation in a main well flow conductor located within a main wellbore, said diverter severably coupled to an end of a drillstring;

boring through a sidewall of said main well flow conductor with a boring tool coupled to an end of said drillstring, said boring creating a window having a particular shape in said sidewall, said orientation of said diverter determining a lateral position of said window in said main well flow conductor, a lateral wellbore thereby being formed in said material and extending from said main wellbore said steps of setting and boring performed in a single trip;

lining said lateral wellbore with a liner and cementing said liner in place within said lateral wellbore, said step of cementing creating a pressure-bearing seal between said periphery of said window and said liner; and locating a slidable flow control device having ports therein proximate said window, said flow control device movable within said well flow conductor to expose said window thereby allowing access to said liner by a tool.

34. A method of creating a multilateral well, comprising the steps of:

setting a diverter having a soft centered drillable core at a prescribed position and a prescribed orientation in a main well flow conductor located within a main wellbore, said diverter severably coupled to an end of a drillstring;

boring through a sidewall of said main well flow conductor with a boring tool coupled to an end of said drillstring, said boring creating a window having a particular shape in said sidewall, said orientation of said diverter determining a lateral position of said window in said main well flow conductor, a lateral wellbore thereby being formed in said material and extending from said main wellbore, said steps of setting and boring performed in a single trip;

lining said lateral wellbore with a liner and cementing said liner in place within said lateral wellbore, said step of cementing creating a pressure-bearing seal between said periphery of said window and said liner; and locating a slidable flow control device proximate said window, said flow control device substantially blocking a flow of fluid between said liner and said main well flow conductor.

35. A system for creating a multilateral well, comprising:

means for diverting set at a prescribed position and a prescribed orientation in a main well flow conductor located within a main wellbore;

means for milling a window into a sidewall of said main well flow conductor and boring into a material surrounding said main well flow conductor, said means for milling creating said window having a particular shape in said sidewall, said orientation of said means for diverting determining a lateral position of said window in said main well flow conductor, a lateral wellbore thereby being formed in said material and extending from said main wellbore;

means, cooperable with said means for diverting, for lining said lateral wellbore, said means for lining having an interface end, said interface end adapted to contact a periphery of said window in said sidewall; and a pressure-bearing seal between said periphery of said window and said interface end of said liner, said liner cemented in place within said lateral wellbore.

36. The system as recited in claim 35, further comprising means for setting said main well flow conductor in said main wellbore, said main well flow conductor including a nipple for locating said diverter at said prescribed position in said main well flow conductor.

37. The system as recited in claim 35, further comprising means for setting said main well flow conductor in said main wellbore, said main well flow conductor including a helical guide therein for rotating said diverter into said prescribed orientation in said main well flow conductor.

38. The system as recited in claim 35, further comprising means for setting a packing device within said main well flow conductor, said packing device including a profile for locating said diverter at said prescribed position and said prescribed orientation in said main well flow conductor.

39. The system as recited in claim 35, further comprising means for injecting said cement into an annular space between said main well flow conductor and a wall of said main wellbore, said cement filling interstices between said periphery of said window and said interface end of said liner to create said pressure-bearing seal.

40. The system as recited in claim 35, further comprising means for accessing a selected one of a distal portion of said main well flow conductor and said liner within said lateral wellbore with a coiled tube rig.

41. The system as recited in claim 35, further comprising means for injecting said cement into an annular space between said main well flow conductor and a wall of said main wellbore from ports located in said main well flow conductor.

42. The system as recited in claim 35, further comprising means for injecting an elastomeric cement into an annular space between said main well flow conductor and a wall of said main wellbore to thereby create a flexible seal between said main well flow conductor and said liner.

43. The system as recited in claim 35, further comprising means for washing down said liner until said liner reaches a final position within said lateral wellbore.

44. The system as recited in claim 35, further comprising means for setting a packing device in said main well flow conductor, a hydraulic hose from a boring tool allowing said packing device to be hydraulically set.

45. A system for creating a multilateral well, comprising:

means for diverting set at a prescribed position and a prescribed orientation in a main well flow conductor located within a main wellbore;

means for boring through a sidewall of said main well flow conductor and into a material surrounding said main well flow conductor, said means for boring creating a window having a particular shape in said sidewall, said orientation of said means for diverting determining a lateral position of said window in said main well flow conductor, a lateral wellbore thereby being formed in said material and extending from said main wellbore;

means, cooperable with said means for diverting, for lining said lateral wellbore, said means for lining having an interface end, said interface end adapted to contact a periphery off said window in said sidewall;

a pressure-bearing seal between said periphery of said window and said interface end of said liner, said liner cemented in place within said lateral wellbore; and means for setting said main well flow conductor in said main wellbore, said main well flow conductor including a joint composed of a composite material, said drillstring drilling through a sidewall of said joint and into said material surrounding said main well flow conductor with a single drilling tool.

46. A system for creating a multilateral well, comprising:

means for diverting set at a prescribed position and a prescribed orientation in a main well flow conductor located within a main wellbore;

means for boring through a sidewall of said main well flow conductor and into a material surrounding said main well flow conductor, said means for boring creating a window having a particular shape in said sidewall, said orientation of said means for diverting determining a lateral position of said window in said main well flow conductor, a lateral wellbore thereby being formed in said material and extending from said main wellbore;

means, cooperable with said means for diverting, for lining said lateral wellbore, said means for lining having an interface end, said interface end adapted to contact a periphery of said window in said sidewall;

a pressure-bearing seal between said periphery of said window and said interface end of said liner, said liner cemented in place within said lateral wellbore; and a preformed window member having a preformed window of a prescribed shape formed therein in said main well flow conductor.

47. A system for creating a multilateral well, comprising:

means for diverting set at a prescribed position and a prescribed orientation in a main well flow conductor located within a main wellbore;

means for boring through a sidewall of said main well flow conductor and into a material surrounding said main well flow conductor, said means for boring creating a window having a particular shape in said sidewall, said orientation of said means for diverting determining a lateral position of said window in said main well flow conductor, a lateral wellbore thereby being formed in said material and extending from said main wellbore;

means, cooperable with said means for diverting, for. lining said lateral wellbore, said means for lining having an interface end, said interface end adapted to contact a periphery of said window in said sidewall;

a pressure-bearing seal between said periphery of said window and said interface end of said liner, said liner cemented in place within said lateral wellbore; and means for injecting said cement into an annular space between said main well flow conductor and a wall of said main wellbore from ports located in said liner.

48. A system for creating a multilateral well, comprising:

means for diverting set at a prescribed position and a prescribed orientation in a main well flow conductor located within a main wellbore;

means for boring through a sidewall of said main well flow conductor and into a material surrounding said main well flow conductor, said means for boring creating a window having a particular shape in said sidewall, said orientation of said means for diverting determining a lateral position of said window in said main well flow conductor, a lateral wellbore thereby being formed in said material and extending from said main wellbore;

means, cooperable with said means for diverting, for lining said lateral wellbore;

a pressure-bearing seal between said periphery of said window and said interface end of said liner, said liner cemented in place within said lateral wellbore; and means for locating a slidable flow control device having ports therein proximate said window, said flow control device movable within said well flow conductor to expose said window thereby allowing access to said liner by a tool.

49. A system for creating a multilateral well, comprising:

means for diverting set at a prescribed position and a prescribed orientation in a main well flow conductor located within a main wellbore;

means for boring through a sidewall of said main well flow conductor and into a material surrounding said main well flow conductor, said means for boring creating a window having a particular shape in said sidewall, said orientation of said means for diverting determining a lateral position of said window in said main well flow conductor, a lateral wellbore thereby being formed in said material and extending from said main wellbore;

means, cooperable with said means for diverting, for lining said lateral wellbore;

a pressure-bearing seal between said periphery of said window and said interface end of said liner, said liner cemented in place within said lateral wellbore; and means for locating a slidable flow control device proximate said window, said flow control device substantially blocking a flow of fluid between said liner and said main well flow conductor.

50. A system for creating a multilateral well, comprising:

a whipstock having a hollow metal conduit with a soft centered core at a prescribed position and a prescribed orientation in a main well flow conductor located within a main wellbore, said whipstock severably coupled to an end of a drillstring;

means for boring through a sidewall of said main well flow conductor and into a material surrounding said main well flow conductor, said means for boring creating a window having a particular shape in said sidewall, said orientation of said whipstock determining a lateral position of said window in said main well flow conductor, a lateral wellbore thereby being formed in said material and extending from said main wellbore;

means, cooperable with said whipstock, for lining said lateral wellbore, said means for lining adapted to contact a periphery of said window in said sidewall; and a pressure-bearing seal between said periphery of said window and said liner, said liner cemented in place within said lateral wellbore.

51. The system as recited in claim 50, further comprising means for setting said main well flow conductor in said main wellbore, said main well flow conductor including a nipple for locating said diverter at said prescribed position in said main well flow conductor.

52. The system as recited in claim 50, further comprising means for setting a packing device within said main well flow conductor, said packing device including a profile for locating said diverter at said prescribed position and said prescribed orientation in said main well flow conductor.

53. The system as recited in claim 50, further comprising a preformed window member having a preformed window of a prescribed shape formed therein in said main well flow conductor.

54. The system as recited in claim 50, wherein said diverter is coupled to said drillstring via a severable link.

55. The system as recited in claim 50, further comprising means for injecting said cement into an annular space between said main well flow conductor and a wall of said main wellbore, said cement filling interstices between said periphery of said window and said liner to create said pressure-bearing seal.

56. The system as recited in claim 50, further comprising means for removing cement injected into said hollow core of said diverter.

57. The system as recited in claim 50, further comprising means for accessing a selected one of a distal portion of said main well flow conductor and said liner within said lateral wellbore with a coiled tube rig.

58. The system as recited in claim 50, further comprising means for injecting said cement into an annular space between said main well flow conductor and a wall of said main wellbore from ports located in said liner.

59. The system as recited in claim 50, further comprising means for injecting said cement into an annular space between said main well flow conductor and a wall of said main wellbore from ports located in said main well flow conductor.

60. The system as recited in claim 50, further comprising means for injecting an elastomeric cement into an annular space between said main well flow conductor and a wall of said main wellbore to thereby create a flexible seal between said main well flow conductor and said liner.

61. The system as recited in claim 50, further comprising means for washing down said liner until said liner reaches a final position within said lateral wellbore.

62. The system as recited in claim 50, further comprising means for setting a packing device in said main well flow conductor, a hydraulic hose from said drillstring allowing said packing device to be hydraulically set.

63. The system as recited in claim 50, further comprising a plurality of lateral wellbores formed in said material and extending from said main wellbore.

64. A system for creating a multilateral well, comprising:
a whipstock having a hollow metal conduit with a soft centered core at a prescribed position and a prescribed orientation in a main well flow conductor located within a main wellbore, said whipstock severably coupled to an end of a drillstring;
means for boring through a sidewall of said main well flow conductor and into a material surrounding said main well flow conductor, said means for boring creating a window having a particular shape in said sidewall, said orientation of said whipstock determining a lateral position of said window in said main well flow conductor, a lateral wellbore thereby being formed in said material and extending from said main wellbore;
means, cooperable with said whipstock, for lining said lateral wellbore, said means for lining adapted to contact a periphery of said window in said sidewall;
a pressure-bearing seal between said periphery of said window and said liner, said liner cemented in place within said lateral wellbore; and
means for setting said main well flow conductor in said main wellbore, said main well flow conductor including a helical guide therein for rotating said diverter into said prescribed orientation in said main well flow conductor.

65. A system for creating a multilateral well, comprising:
a whipstock having a hollow metal conduit with a soft centered core at a prescribed position and a prescribed orientation in a main well flow conductor located within a main wellbore, said whipstock severably coupled to an end of a drillstring;
means for boring through a sidewall of said main well flow conductor and into a material surrounding said main well flow conductor, said means for boring creating a window having a particular shape in said sidewall, said orientation of said whipstock determining a lateral position of said window in said main well flow conductor, a lateral wellbore thereby being formed in said material and extending from said main wellbore;
means, cooperable with said whipstock, for lining said lateral wellbore, said means for lining adapted to contact a periphery of said window in said sidewall;
a pressure-bearing seal between said periphery of said window and said liner, said liner cemented in place within said lateral wellbore; and
means for setting said main well flow conductor in said main wellbore, said main well flow conductor including a joint composed of a composite material, said drillstring drilling through a sidewall of said joint and into said material surrounding said main well flow conductor with a single drilling tool.

66. A system for creating a multilateral well, comprising:
a whipstock having a hollow metal conduit with a soft centered core at a prescribed position and a prescribed orientation in a main well flow conductor located within a main wellbore, said whipstock severably coupled to an end of a drillstring;
a milling tool for milling a window into said sidewall of said main well flow conductor and a drilling tool for drilling into said material surrounding said main well flow conductor, said sidewall being composed of a metallic material, said orientation of said whipstock determining a lateral position of said window in said main well flow conductor, a lateral wellbore thereby being formed in said material and extending from said main wellbore;
means, cooperable with said whipstock, for lining said lateral wellbore, said means for lining adapted to contact a periphery of said window in said sidewall; and
a pressure-bearing seal between said periphery of said window and said liner, said liner cemented in place within said lateral wellbore.

67. A system for creating a multilateral well, comprising:
a whipstock having a hollow metal conduit with a soft centered core at a prescribed position and a prescribed orientation in a main well flow conductor located within a main wellbore, said whipstock severably coupled to an end of a drillstring;

means for boring through a sidewall of said main well flow conductor and into a material surrounding said main well flow conductor, said means for boring creating a window having a particular shape in said sidewall, said orientation of said whipstock determining a lateral position of said window in said main well flow conductor, a lateral wellbore thereby being formed in said material and extending from said main wellbore;

means, cooperable with said whipstock, for lining said lateral wellbore, said means for lining adapted to contact a periphery of said window in said sidewall;

a pressure-bearing seal between said periphery of said window and said liner, said liner cemented in place within said lateral wellbore; and means for locating a slidable flow control device having ports therein proximate said window, said flow control device movable within said well flow conductor to expose said window thereby allowing access to said liner by a tool.

68. A system for creating a multilateral well, comprising:

a whipstock having a hollow metal conduit with a soft centered core at a prescribed position and a prescribed orientation in a main well flow conductor located within a main wellbore, said whipstock severably coupled to an end of a drillstring;

means for boring through a sidewall of said main well flow conductor and into a material surrounding said main well flow conductor, said means for boring creating a window having a particular shape in said sidewall, said orientation of said whipstock determining a lateral position of said window in said main well flow conductor, a lateral wellbore thereby being formed in said material and extending from said main wellbore;

means, cooperable with said whipstock, for lining said lateral wellbore, said means for lining adapted to contact a periphery of said window in said sidewall;

a pressure-bearing seal between said periphery of said window and said liner, said liner cemented in place within said lateral wellbore; and means for locating a slidable flow control device proximate said window, said flow control device substantially blocking a flow of fluid between said liner and said main well flow conductor.

69. A subterranean multilateral well structure, comprising:

a main well flow conductor located within a main wellbore, a sidewall of said main well flow conductor including a plurality of windows having a particular shape distributed along a length of said main well flow conductor, said windows having lateral orientations;

a plurality of lateral wellbores formed in material surrounding said main wellbore, said lateral wellbores extending from respective ones of said plurality of windows;

liners having interface ends cemented within each of said lateral wellbores, said interface ends of said liners adapted to contact peripheries of respective one of said windows in said sidewall;

pressure-bearing seals between said peripheries of said windows and said interface ends of said liners to thereby provide for (a) connectivity among said main wellbore and said lateral wellbores, (b) pressure-bearing sealing of joints to allow selective isolation of a portion of said lateral wellbores and (c) subsequent selective access to said lateral wellbores; and a helical guide therein for orienting a tool with respect to one of said plurality of said lateral wellbores.

70. The structure as recited in claim 69, further comprising a nipple for locating a diverter at a prescribed position in said main well flow conductor.

71. The structure as recited in claim 69, further comprising a helical guide therein for rotating a diverter into a prescribed orientation in said main well flow conductor.

72. The structure as recited in claim 69, further comprising a packing device within said main well flow conductor, said packing device including a profile for locating a diverter at a prescribed position and a prescribed orientation in said main well flow conductor.

73. The structure as recited in claim 69, further comprising a whipstock located at a prescribed position and a prescribed orientation in said main well flow conductor, said whipstock having a slanted face thereon adapted to divert a boring tool.

74. The structure as recited in claim 69, further comprising a flange extending radially outward from each of said plurality of liners, said flange adapted to contact an inner surface of said sidewall of said main well flow conductor.

75. The structure as recited in claim 69, further comprising cement located in interstices between said peripheries of said window and said interface ends of said liners to create said pressure-bearing seals.

76. The structure as recited in claim 69, further comprising a coiled tube rig for accessing a selected ones of said lateral wellbores.

77. The structure as recited in claim 69, further comprising an elastomeric cement located in an annular space between said main well flow conductor and a wall of said main wellbore to thereby create a flexible seal between said main well flow conductor and said liner.

78. A subterranean multilateral well structure, comprising:

a main well flow conductor located within a main wellbore, a sidewall of said main well flow conductor including a plurality of windows having a particular shape distributed along a length of said main well flow conductor, said windows having lateral orientations;

a plurality of lateral wellbores formed in material surrounding said main wellbore, said lateral wellbores extending from respective ones of said plurality of windows;

liners having interface ends cemented within each of said lateral wellbores, said interface ends of said liners adapted to contact peripheries of respective one of said windows in said sidewall;

pressure-bearing seals between said peripheries of said windows and said interface ends of said liners to thereby provide for (a) connectivity among said main wellbore and said lateral wellbores, (b) pressure-bearing sealing of joints to allow selective isolation of a portion of said lateral wellbores and subsequent selective access to said lateral wellbores; and a joint composed of a composite material.

79. A subterranean multilateral well structure, comprising:

a main well flow conductor located within a main wellbore, a sidewall of said main well flow conductor including a plurality of windows having a particular shape distributed along a length of said main well flow conductor, said windows having lateral orientations;

a plurality of lateral wellbores formed in material surrounding said main wellbore, said lateral wellbores extending from respective ones of said plurality of windows;

liners having interface ends cemented within each of said lateral wellbores, said interface ends of said liners adapted to contact peripheries of respective one of said windows in said sidewall;

pressure-bearing seals between said peripheries of said windows and said interface ends of said liners to thereby provide for (a) connectivity among said main wellbore and said lateral wellbores, (b) pressure-bearing sealing of joints to allow selective isolation of a portion of said lateral wellbores and subsequent selective access to said lateral wellbores; and a preformed window member having a preformed window of a prescribed shape formed therein in said main well flow conductor.

80. A subterranean multilateral well structure, comprising:

a main well flow conductor located within a main wellbore, a sidewall of said main well flow conductor including a plurality of windows having a particular shape distributed along a length of said main well flow conductor, said windows having lateral orientations;

a plurality of lateral wellbores formed in material surrounding said main wellbore, said lateral wellbores extending from respective ones of said plurality of windows;

liners having ends cemented within each of said lateral wellbores;

pressure-bearing seals between said peripheries of said windows and said interface ends of said liners to thereby provide for (a) connectivity among said main wellbore and said lateral wellbores, (b) pressure-bearing sealing of joints to allow selective isolation of a portion of said lateral wellbores and subsequent selective access to said lateral wellbores; and ports located in said liners.

81. A subterranean multilateral well structure, comprising:

a main well flow conductor located within a main wellbore, a sidewall of said main well flow conductor including a plurality of windows having a particular shape distributed along a length of said main well flow conductor, said windows having lateral orientations;

a plurality of lateral wellbores formed in material surrounding said main wellbore, said lateral wellbores extending from respective ones of said plurality of windows;

liners having ends cemented within each of said lateral wellbores;

pressure-bearing seals between said peripheries of said windows and said interface ends of said liners to thereby provide for (a) connectivity among said main wellbore and said lateral wellbores, (b) pressure-bearing sealing of joints to allow selective isolation of a portion of said lateral wellbores and subsequent selective access to said lateral wellbores; and ports located in said main well flow conductor.

82. A subterranean multilateral well structure, comprising:

a main well flow conductor located within a main wellbore, a sidewall of said main well flow conductor including a plurality of windows having a particular shape distributed along a length of said main well flow conductor, said windows having lateral orientations;

a plurality of lateral wellbores formed in material surrounding said main wellbore, said lateral wellbores extending from respective ones of said plurality of windows;

liners having ends cemented within each of said lateral wellbores;

pressure-bearing seals between said peripheries of said windows and said interface ends of said liners to thereby provide for (a) connectivity among said main wellbore and said lateral wellbores, (b) pressure-bearing sealing of joints to allow selective isolation of a portion of said lateral wellbores and subsequent selective access to said lateral wellbores; and slidable flow control devices having ports therein proximate said plurality of windows, said flow control devices movable within said well flow conductor to expose said windows thereby allowing access to said liners by a tool.

83. A subterranean multilateral well structure, comprising:

a main well flow conductor located within a main wellbore, a sidewall of said main well flow conductor including a plurality of windows having a particular shape distributed along a length of said main well flow conductor, said windows having lateral orientations;

a plurality of lateral wellbores formed in material surrounding said main wellbore, said lateral wellbores extending from respective ones of said plurality of windows;

liners having ends cemented within each of said lateral wellbores;

pressure-bearing seals between said peripheries of said windows and said interface ends of said liners to thereby provide for (a) connectivity among said main wellbore and said lateral wellbores, (b) pressure-bearing sealing of joints to allow selective isolation of a portion of said lateral wellbores and subsequent selective access to said lateral wellbores; and slidable flow control devices proximate said windows, said flow control devices adapted to assume a position substantially blocking a flow of fluid between said liners and said main well flow conductor.

* * * * *

UNITED STATES PATENT AND TRADEMARK OFFICE
CERTIFICATE OF CORRECTION

PATENT NO. : 5,564,503
DATED : October 15, 1996
INVENTOR(S) : Longbottom, et al.

It is certified that error appears in the above-indentified patent and that said Letters Patent is hereby corrected as shown below:

On the title page, item [75], Inventors: insert the following:
-- Richard C. Jacquier, Denmark; Tommie A. Freeman, The Netherlands; Harold W. Nivens, Runaway Bay, Texas; Paul D. Holbrook, Lewisville, Texas; David H. Mills, Scotland --.

Signed and Sealed this

Twenty-ninth Day of April, 1997

Attest:

BRUCE LEHMAN

Attesting Officer

Commissioner of Patents and Trademarks